United States Patent
Saito et al.

[11] Patent Number: 5,886,922
[45] Date of Patent: Mar. 23, 1999

[54] PROBE DEVICE FOR MEMORY DEVICE HAVING MULTIPLE CANTILEVER PROBES

[75] Inventors: Mitsuchika Saito, Kawasaki, Japan; You-Wen Yi, Sunnyvale, Calif.

[73] Assignee: Hewlett-Packard Company, Palo Alto, Calif.

[21] Appl. No.: 852,369

[22] Filed: May 7, 1997

[51] Int. Cl.⁶ ................................................. G11C 11/50
[52] U.S. Cl. .......................... 365/164; 365/151; 365/174
[58] Field of Search ..................................... 365/164, 174, 365/151

[56] References Cited

U.S. PATENT DOCUMENTS

| | | | |
|---|---|---|---|
| 4,945,515 | 7/1990 | Ooumi et al. | 365/174 |
| 5,216,631 | 6/1993 | Sliwa et al. | 365/174 |
| 5,276,672 | 1/1994 | Miyazaki et al. | 250/306 |

*Primary Examiner*—David Nelms
*Assistant Examiner*—Hoai V. Ho
*Attorney, Agent, or Firm*—Ian Hardcastle

[57] ABSTRACT

A memory device that comprises a planar memory medium and a probe device mounted opposite the planar memory medium. The probe device includes a substrate having a substrate surface and probe cells arrayed on the substrate surface. Each of the probe cells comprises a probe, an auxiliary electrode and a probe driving circuit. The probe is formed in the substrate, includes part of the substrate surface, and additionally includes a conductive needle projecting towards the memory medium. The conductive needle includes a needle tip adjacent the memory medium. The auxiliary electrode is mounted on the probe, and is located between the probe and the memory medium. The auxiliary electrode is disposed substantially parallel to, and spaced from, the substrate surface. The driving circuit is formed in the substrate and projects from the substrate surface towards the memory medium. The probe driving circuit has outputs electrically connected to the auxiliary electrode and the memory medium.

20 Claims, 22 Drawing Sheets

PROBE DEVICE FOR MEMORY DEVICE HAVING MULTIPLE CANTILEVER PROBES

PRIOR APPLICATIONS

This application is continuation-in-part of pending prior International Application under the Patent Cooperation Treaty, International Application No. PCT/US95/12932, International Filing Date 6 Oct., 1995.

TECHNICAL FIELD

The invention concerns a memory device in which information is read and written using multiple cantilever probes, and specifically concerns a memory device in which the stray capacitance of the wiring between the probes and the write-read circuits ("W/R circuits") is small, the device is relatively immune to the effects of noise, the cost of manufacturing the device is low, and the recording density of the device is high.

BACKGROUND OF THE INVENTION

Examples of conventional memory devices that read and write information using multiple probes include such devices as those disclosed in J. Sliwa, Jr., *Microvibratory Memory Device*, U.S. Pat. No. 5,216,631 ("Sliwa, Jr."). In such devices, techniques for controlling the spacing between needles and the surfaces of detected objects in STM (scanning tunnel microscopes), and in AFM (atomic force microscopes) operated in a non-contact mode, are used to control the spacing between the tip of a tapered needle and a memory medium in a cell of a memory device. To read and write information in such memory devices requires that the distance between the memory medium and the tip of the needle be dynamically adjusted to a precise value. This distance adjustment is accomplished by detecting the distance between the memory medium and the tip of the needle.

In the memory devices disclosed by Sliwa, Jr., the distance between the memory medium and the tip of the needle is detected by measuring a tunneling current or by measuring a force between the tip of the needle and the memory medium. Accordingly, in such memory devices, a detection circuit, and a signal processing circuit for performing distance detection and distance control must be provided for each probe, in addition to a W/R circuit. These additional circuits, i.e., the detection circuits and signal processing circuits, cause an overall increase in the surface area occupied by each probe and its associated circuits. As a result, when the probes and their associated circuits are located on the same substrate, the detection and signal processing circuits make it more difficult to achieve a high probe density.

For the above reasons, in the memory devices disclosed by Sliwa, Jr., the W/R circuits, detection circuits, and signal processing circuits are located on a different substrate from the substrate in which the probes are formed. Separate manufacturing processes are used to form the probes and their associated circuits in separate locations.

As a result of the probes and their associated circuits being located on different substrates in the memory devices disclosed by Sliwa, Jr., the probes are connected to their associated circuits by relatively long wiring. The relatively long wiring has considerable stray capacitance, and easily picks up noise. To ameliorate the effects of stray capacitance and noise pickup in the interconnections between the probes and their associated W/R circuits necessitates an increase in the bit size of the memory medium.

Moreover, the distance between the probes and their associated circuits varies from probe to probe. This creates a skew in the probe locations so that a high parallelness cannot be obtained between the probes. This leads to problems. For example, the electrical characteristics of the areas between the probes and their associated circuits may differ. As a result, performance values which are important in a memory device, e.g., data transmission rate, assurance of redundancy, and error correction functions, are impaired.

In memory devices that use multiple probes to read and write information, the amount of information that is read or written in one access operation increases with increasing probe density. In the wiring used to transmit the reading or writing signals, at least one line is required for each probe. Consequently, the large number of lines required interferes with achieving a high probe density.

SUMMARY OF THE INVENTION

The invention provides a memory device that comprises a planar memory medium and a probe device mounted opposite the planar memory medium. The probe device includes a substrate having a substrate surface and probe cells arrayed on the substrate surface. Each of the probe cells comprises a probe, an auxiliary electrode and a probe driving circuit. The probe is formed in the substrate, includes part of the substrate surface, and additionally includes a conductive needle projecting towards the memory medium. The conductive needle includes a needle tip adjacent the memory medium. The auxiliary electrode is mounted on the probe, and is located between the probe and the memory medium. The auxiliary electrode is disposed substantially parallel to, and spaced from, the substrate surface. The driving circuit is formed in the substrate and projects from the substrate surface towards the memory medium. The probe driving circuit has outputs electrically connected to the auxiliary electrode and the memory medium.

The invention additionally provides a memory device that comprises a planar memory medium and a probe device mounted opposite the planar memory medium. The probe device includes a substrate having a substrate surface, and probes arrayed on the substrate surface. Each of the probes includes a probe main body and a conductive needle projecting from the probe main body. The conductive needle terminates in a needle tip that has a length in the direction perpendicular to the substrate surface, and having a length and having a constant cross section along its length in a plane parallel to the substrate surface.

Finally, the invention provides a memory device that comprises a planar memory medium and a probe device mounted opposite the planar memory medium. The probe device includes a semiconductor surface layer having a surface, an insulating layer under the semiconductor surface layer, and probe cells arrayed on the surface. Each of the probe cells comprises a cantilever probe and an open-loop probe driving circuit. The cantilever probe is defined in the semiconductor surface layer and has a first end attached to the insulating layer. The probe includes a conductive needle mounted near a second end, projecting towards the memory medium and terminating in a columnar needle tip adjacent the memory medium. The open-loop probe driving circuit is formed near the cantilever probe and has an output electrically connected to the probe. The open loop probe driving amplifier generates a predetermined probe actuating voltage that actuates the probe to bring the needle tip into contact with the memory medium for reading or writing information in the memory medium.

Memory devices according to the invention provide at least the following advantages over conventional probe-based memory devices.

Because the probes, W/R circuits, and probe driving circuits are manufactured by a monolithic semiconductor process, the cost of manufacturing the probes can be reduced. Furthermore, because the probes are installed in close proximity to each other on the probe device, a high parallelness is assured for the respective probes.

By installing the probes, W/R circuits, and probe driving circuits in close proximity to each other, it is possible to share the same bus lines among multiple probe cells. Sharing one bus line among multiple probe cells enables the density of the probes to be increased.

The probes are preferably actuated by an attractive electrostatic force exerted between the probes and the memory substrate. In particular, by installing electrode fins on the probes, it is possible to insure a sufficient actuation force even when the W/R circuits and probe driving circuits protrude from the substrate surface of the probe device.

The probes may alternatively be actuated by a repulsive electrostatic force exerted between the probe and auxiliary electrodes mounted on the substrate adjacent the probe.

Because the needle tips of the conductive needles are columnar bodies having a uniform cross section along their lengths, there is no change in the shape of the part of the needle tip that contacts the memory medium, even if the needle tip wears as a result of contact with the memory medium.

The probes can take the form of L-shaped cantilevers composed of first and second arms that are disposed orthogonal to one another and are electrically insulated from one another. The first arm can be used to provide an electrical connection between the W/R circuit and the conductive needle, and the second arm can serve as an electrode for actuating the probe. This arrangement significantly reduces the stray capacitance between the electrode and the electrical connection to the conductive needle.

Each probe is actuated by an open-loop probe driving circuit that applies a predetermined probe actuation voltage to the probe. The probe actuation voltage is such that the repulsive force applied by the memory medium to the atoms in the needle tip of the conductive needle in reaction to the actuation force when the needle tip contacts the memory medium does not exceed the bonding force of the atoms of the material of the needle tip when divided among the atoms of the material of the needle tip contacting the memory medium. Accordingly, wear and damage of the needle tips is virtually eliminated, so that the durability of the probes is greatly increased compared to conventional probes.

DETAILED DESCRIPTION OF THE INVENTION

Figure 1:
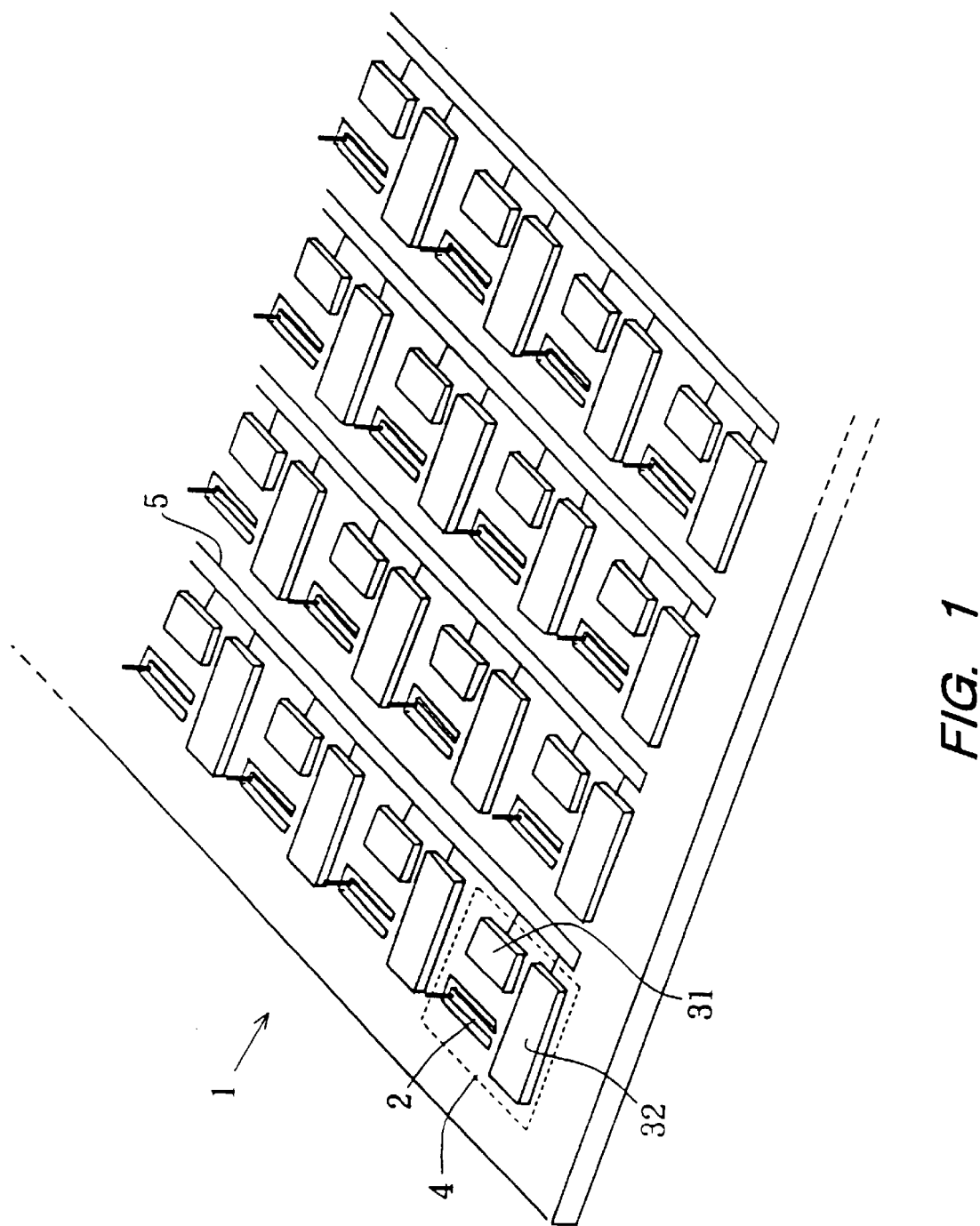
FIG. 1 illustrates one embodiment of the memory device according to the invention in which the probes are cantilever-type probes that have the form of long, flat, plate-form cantilevers.

The invention provides a memory device in which (a) there is little stray capacitance in the wiring between the probes and the W/R circuits, so that the device is relatively immune to the effects of noise; (b) a high parallelness is maintained for the respective probes; (c) the cost of manufacture is low; and (d) the recording density is high. In the memory device according to the invention, the probes and their associated circuits, such as W/R circuits and probe driving circuits, are formed in the same substrate by a series of fabrication process steps. This enables the probes and circuits to be located in close proximity to each other, so that a high parallelness of the probes is maintained.

Forming all the probes in the same substrate enables the probes to have highly consistent mechanical properties, which allows the probes to be actuated by a predetermined actuation force supplied by a simple, open-loop probe driving circuit. No distance detection and signal processing circuits are required in the circuits associated with the probes. Simplifying the circuits associated with the probes enables the probe density to be increased.

Moreover, locating the probe and its associated W/R circuit and probe driving circuit on the substrate next to one another to form a probe cell enables a common bus to be shared between multiple probe cells to exchange signals between the circuits of the probe cells and the various peripheral circuits of the memory device. This enables the density of the probes to be further increased.

The memory device according to the invention includes a large number of probe cells. For example, 100,000 probe cells is typical. Such a large number of probe cells greatly increases the rate at which information can be read or written in the memory medium. The probe cells may be arranged in either a one-dimensional or a two-dimensional array, with the latter being preferred arrangement since it provides a higher recording density.

In the memory device according to the invention, the probe cells are manufactured by a series of monolithic semiconductor and micro-machining processes. Compared to conventional manufacturing processing, this greatly simplifies the processing required to manufacture the probes and their respective circuits in the quantities required, which reduces the cost of the memory device as a whole. Also, this way of manufacturing the probes also enables the probes to be made with very consistent mechanical properties. This enables the probes to be actuated using an open-loop probe driver circuit without the need for probe distance detection circuits and signal processing circuits.

Furthermore, because the W/R circuits and the probes are formed in close proximity to each other, not only is a high parallelness insured for the probes, but also, the distance between each probe and its associated W/R circuit is small, the stray capacitance of the wiring is much smaller than in conventional devices, so that the susceptibility to noise pickup is greatly reduced. Moreover, since the distance between each probe and its associated circuits can be made the same for all probes, variations between the probe cells and the circuits of the cells can be reduced.

Forming the circuits associated with each probe next to the probe enables an ordinary bus line system to be used to transmit signals between the W/R circuits and peripheral circuits. The rate at which information is read or written is low compared to the data transmission rate of conventional bus lines, so a single bus line can be used for 100 or more probe cells. Thus, the space occupied by the bus lines is small, and the bus lines do not limit the probe density that can be achieved.

In a memory device according to the invention, a suitable force actuates the probes to move the tips of conductive needles mounted on the probes into contact and out of contact with the memory medium. Information is read and written in the memory medium when the needle tips are in contact with the memory medium. The probes may be bimorph-type probes actuated by piezoelectric force, but are preferably actuated by electrostatic force since probes actuated by electrostatic force have a simpler structure than bimorph probes. When the probes are actuated by electrostatic force, the force is exerted between two electrodes. The main body of the probe can serve as one of the electrodes. The electrostatic force can be an attractive electrostatic force or a repulsive electrostatic force. Probes suitable for actuation by an electrostatic force are basically cantilever type probes. An attractive force actuates such cantilever-type probes more efficiently than a repulsive force. In embodiments in which the probes are actuated by an attractive electrostatic force, the memory substrate can serve as the other of the electrodes.

The probe device used in the memory device according to the invention can be fabricated from a composite wafers having one of various layer structures. Suitable composite wafers can easily be obtained from wafer makers. A suitable composite wafer is composed of a semiconductor surface layer, a silicon dioxide ($SiO_2$) intermediate layer, and a silicon (Si) substrate. The semiconductor surface layer is preferably a layer of single-crystal silicon. The main bodies of the probes can be made in the semiconductor surface layer of composite wafers of this type.

Alternatively, the probe device used in the memory device according to the invention can be fabricated using bulk silicon wafers. In this case, the main bodies of the probes are formed from polysilicon deposited on the surface of a silicon dioxide layer formed on the bulk silicon wafer.

In embodiments in which the probes and their associated circuits, e.g., W/R circuits, are formed on the same substrate, circuit elements such as transistors may project above the original surface layer of the wafer. When the probes are formed a semiconductor surface layer or a polysilicon layer on the substrate, the distance between the probe device and the memory medium must be increased to accommodate the projecting circuit elements. When the probes are actuated by an attractive electrostatic force exerted between the probes and the memory substrate, the large distance between the probes and the memory substrate reduces the actuating force generated by a given probe actuation voltage. This makes it difficult to achieve good control of the probe.

To enable the probes to be actuated by a relatively low probe actuation voltage regardless of the distance between the probe device and the memory substrate, an auxiliary electrode having a fin disposed parallel to the semiconductor surface layer and, hence, to the memory substrate, is mounted on each of the probes. Such an auxiliary electrode will from now on be referred to as an "electrode fin." In a probe fitted with an electrode fin, the electrode fin is located between the probe main body and the memory substrate, and is preferably formed at a prescribed height above the probe main body. The electrode fin enables the probe to be driven electrostatically with relatively small probe actuation voltage, regardless of the distance between the probe device and the memory medium.

The conductive needles that are used to write information into the memory medium or read information recorded in the memory medium are mounted near the ends of the probes, and extend from the probes towards the memory medium. In the memory device according to the invention, the conductive needles have columnar needle tips, i.e., in a plane parallel to the surface of the semiconductor surface layer, the needle tips have a uniform cross section along their lengths. The uniform cross section of the needle tips prevents the area of the needle tips in contact with the memory medium from changing as the needle tips wear. This greatly reduces the possibility of errors occurring during reading or writing of information.

In the memory device according to the invention, the memory substrate is composed of, for example, a substrate layer supporting a memory medium. Silicon, for example, may be used as the substrate layer. The memory medium may be composed of any of the various materials that allow information to be written by electrical stimulation applied via the conductive needles, and that allow the electrical detection of the written information. For example, a material that traps in the memory medium surface electrons applied to the memory medium surface by the conductive needles may be used. Alternatively, a material in which the memory medium is polarized by a potential applied to the conductive needles may be used. Specifically, materials such as dielectric substances or ferroelectric substances may be used as the memory medium.

When the memory substrate is manufactured, warping may occur as a result of thermal expansion or thermal contraction. Warping causes the spacing between the memory medium and the tips of the conductive needles to vary from probe to probe. To compensate for such variations would require that each probe driving circuit be a closed loop circuit that included a probe distance detection circuit or a probe pressure detection circuit. Such circuits would increase the complexity of the circuits associated with each probe. Furthermore, warping can be so severe as to constitute a fatal defect in the memory substrate.

Warping of the memory substrate is conventionally prevented or reduced by increasing the thickness of the memory substrate. However, this increases the mass of the memory substrate. In memory devices that include a positioning device that positions the probes by moving the memory substrate, an increased mass of the memory substrate reduces the speed at which the mechanism can move the memory substrate. This limits the rate at which information can be read or written.

In the memory device according to the invention, warping of the memory substrate is greatly reduced by forming an array of grooves in the memory substrate. Multiple recording regions are defined in the surface of the memory medium. Each recording area is the area of the memory medium accessed by one conductive needle. Preferably, the grooves are formed in positions corresponding to the boundaries of the recording regions. Forming the array of grooves prevents warping without the need to increase the thickness and, hence, the mass, of the memory substrate. This enables information to be read or written at high speed even when the probes are positioned by moving the memory substrate.

As was described above, the conductive needles write information by applying an electrical stimulus to prescribed recording regions defined in the surface of the memory medium. Furthermore, the needles also act to detect information written in the recording regions. Ordinarily, this is accomplished by electric detection. In embodiments in which the memory medium is a ferroelectric material, the conductive needles contact the surface of the ferroelectric memory medium, and detect the polarity of the surface to read the information, or cause the polarization of the surface of the memory medium to be a prescribed polarity to write information.

To read or write information, a positioning device simultaneously positions all the conductive needles of the probes of the probe device at prescribed positions on the surface of the memory medium. The positioning device includes a control mechanism, which from now on will be called the "X-Y control mechanism." The X-Y control mechanism controls movement in the X and Y directions, i.e., in the plane parallel to the surface of the memory medium. Relative movement between the probes and the surface of the memory medium is controlled by the X-Y control mechanism.

The positioning device causes relative movement in the X- and Y-directions between the conductive needles of the probes and the memory substrate. For example, the positioning device may maintain the memory substrate in a fixed position and may move the probes. Alternatively, the positioning device may maintain the probes in a fixed position, and may move the memory substrate. As a further alternative, the positioning device may move the memory substrate in the X-direction, and may move the probes in the Y-direction. The positioning device may use known control techniques employing piezoelectric materials to accomplish the above-described X-Y positioning and any Z-direction control required by such positioning.

In the preferred embodiment, in which information is read or written with the needle tips of the conductive needles of the probes contacting the memory medium, the consistent mechanical properties of the cantilever probes made by micromachining techniques makes it unnecessary to detect and control the distance between the needle tips and the memory medium. The probe drive circuits apply a predetermined probe actuation voltage to the probes. The probe actuation voltage causes the probe to bring the needle tip of the conductive needle into contact with the memory medium, and so that the needle tip contact the surface of the memory medium with a predetermined force.

The predetermined force is set during design of the memory device so that the repulsive force applied by the memory medium to each needle tip in response to the predetermined force does not exceed the atomic bonding force of the material of the needle tip when divided among the atoms of the material of the needle tip contacting the memory medium. This reduces wear and damage to the needle tips to an insignificant level. Moreover, to reduce wear and damage to the needle tip caused by the additional force applied to the needle tip by reading and writing information, the predetermined force is preferably set so that the repulsive force applied to the needle tip in response to both the predetermined force and the reading or writing force is smaller than the atomic bonding force of the material of the needle tip divided among the atoms of the material of the needle tip contacting the memory medium.

As noted above, since the needle tips of the conductive needles are columnar, i.e., in the plane parallel to the surface of the semiconductor surface layer, the needle tips have a uniform cross section along their lengths, there is no change in the area of contact between the needle tip and the memory medium as the conductive needles wear. This effectively prevent reading and writing errors from occurring. For example, when the memory medium is a ferroelectric material, the conductive needles detect the polarity of the ferroelectric material. Specifically, this may be accomplished by applying an appropriate positive or negative voltage to the conductive needles, and detecting the current that flows in response to the voltage. For example, the change in the current or the integrated value of the current may be detected using an appropriate detection device, such as a sensing amplifier. This way, it can be determined whether or not the current response is accompanied by a reversal of polarity caused by the voltage application. In cases where such destructive reading is performed, the destroyed data can be rewritten following reading.

Because the repulsive force applied to the needle tips of the conductive needles in response to the actuation force and the reading or writing force is shared among many atoms in the needle tips, the needle tips do not necessarily suffer any significant wear or damage even if the repulsive force is greater than the inter-atomic bonding force of the material of the needle tips.

In an embodiment in which the material of the needle tips is silicon carbide (SiC), wear or damage to the needle tips can be reduced to an acceptable level by setting the predetermined force such that the repulsive force is less than approximately 6 nN. Moreover, setting the predetermined force so that the repulsive force is less than approximately 1 nN, for example, reduces the wear or damage to an acceptable level regardless of the material of the needle tips.

Furthermore, the predetermined force can be applied to the probes so that contact between the memory medium and the needle tips is continuous, and so that the needle tips remain in contact with the memory medium during positioning movement as well as during reading and writing. In other words, the memory device can be designed so that the W/R circuits read and write information while the probes are moved in the X and Y directions and the needle tips contact the surface of the memory medium, so that the conductive needles are positioned at prescribed points in the recording regions. Alternatively, it is also possible to actuate the probes so that the contact between the surface of the memory medium and the needle tips is intermittent.

The probe device just described can also be applied to devices other than memory devices which have conductive needles, e.g., scanning probe microscopes.

The following designations are consistently applied in the figures and the following more detailed description of the invention:

1, Probe device; 1A, Semiconductor surface layer; 1B, Insulating intermediate layer; IC, Semiconductor substrate; 2, Probe; 21, Probe main body; (a) Semiconductor layer; (b) Insulating layer; (c) Metal wiring layer; 21A, First arm of L-shaped probe main body; 21B, Second arm of L-shaped probe main body; 211–214, Arms of probe main body with reverse bend; 22, Conductive needle; 22a, Tip of conductive needle; 23, Trough; 31, read/write (W/R) circuit; 32, Probe driving circuit; 4, Probe cell; 5, Bus line; 7, Memory substrate; 71, Memory medium; 72, Substrate; 73, Grooves; 91, Positioning device; P1, P2, Probe driving electrodes; P3, Probe driving auxiliary electrodes; PF, Electrode fins; PM, Electrode formed on memory substrate; S, Substrate surface of probe device.

FIG. 1 shows an embodiment of the probe device 1 that forms part of the memory device according to the invention. In the probe device 1, the probes 2 are formed in an array on a surface of the probe device. In the memory device, this surface is mounted opposite the memory medium. The W/R circuit 31 and probe driving circuit 32 associated with each of the probes 2 are formed in close proximity to the respective probes 2. Each of the probes 2, together with its associated W/R circuit 31 and probe driving circuit 32, constitutes a probe cell 4. Bus lines 5 are formed on the surface of the probe device 1. The W/R circuits 31 and probe driving circuits 32 of a number of the probe cells 4 are connected to each of the bus lines and exchange signals with circuits installed on the periphery of the probe device 1 via the bus lines and terminals (not shown) formed on the probe device 1. In the memory device according to the invention, as will be described in more detail below, the probes 2, W/R circuits 31, probe driving circuits 32, and bus lines 5 are formed by a monolithic semiconductor process.

Figure 2:
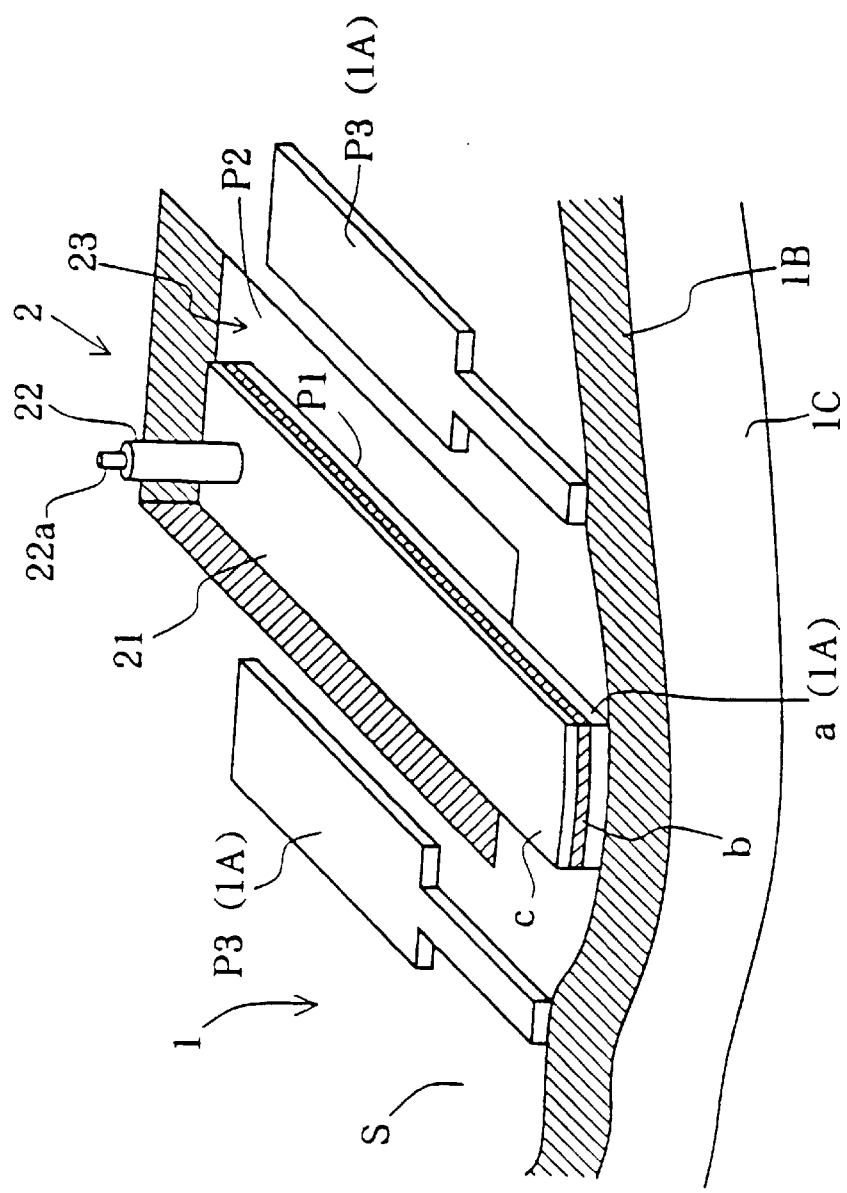
FIG. 2 is an enlarged view of one of the probes shown in FIG. 1.

FIG. 2 shows one of the probes 2 of the probe device shown in FIG. 1 in detail. The probe device 1 shown in FIG. 2 can be manufactured from, for example, a composite wafer composed of the semiconductor surface layer 1A, the semiconductor substrate 1C and the insulating intermediate layer 1B sandwiched between the semiconductor surface layer and the substrate. The semiconductor surface layer is preferably a layer of single-crystal silicon.

In the embodiment of the invention shown in FIG. 2, the main body 21 of each probe 2 is an elongate, single-beam cantilever having one end attached to the substrate surface (S), which is the surface of the insulating intermediate layer 1B, and extending over the trough 23 formed in the insulating intermediate layer. The conductive needle 22 is mounted on the end of the probe main body 21 remote from the end attached to the insulating intermediate layer. At the tip of the conductive needle 22 remote from the probe main body is the needle tip 22a. The needle tip is columnar, i.e., in a plane parallel to the semiconductor surface layer 1A, the needle tip has a uniform cross section along its length.

The probe main body 21 is composed of the semiconductor layer (a), the metal wiring layer (c) and the insulating layer (b) sandwiched between the semiconductor layer and the wiring layer. The semiconductor layer (a) is formed from the semiconductor surface layer 1A of the composite wafer, and is electrically connected to the probe driving circuit 32 (FIG. 1) associated with the probe 2. The insulating layer (b) is formed on the surface of this semiconductor layer (a) and insulates the wiring layer (c) from the semiconductor layer. The metal wiring layer (c) is formed on the surface of the insulating layer (b), and electrically connects the conductive needle 22 to the W/R circuit 31 (FIG. 1) associated with the probe 2.

The probe main body 21 extends over the trough 23. The trough 23 extends through the insulating intermediate layer 1B of the composite wafer to expose the surface of the semiconductor substrate 1C at its bottom. The insulating intermediate layer 1B electrically insulates the semiconductor substrate 1C from the semiconductor layer (a) of the probe main body 21. The part of the semiconductor layer (a) that forms part of the probe main body also constitutes the driving electrode P1, and the bottom surface of the trough 23, i.e., the exposed surface of the semiconductor substrate 1C, constitutes the driving electrode P2.

A pair of auxiliary electrodes P3, P3, is formed in the semiconductor surface layer 1A along the long sides of the trough 23. The electrodes P1, P2 and P3 are electrically connected to the probe driving circuit 32 in the configuration shown in FIG. 3A. The probe driving circuit 32 is connected to the electrodes so that the electrodes P1 and P2 are connected to the negative terminal of the probe driving circuit, and the auxiliary electrodes P3, P3 are connected to the positive terminal of the probe driving circuit. The probe driving circuit applies the predetermined probe actuation voltage V between the electrodes P1, P2 and the electrodes P3, P3 to actuate the probe. For example, when the probe device is used in a memory device, the probe actuation voltage V actuates the probe by an amount that causes the needle tip 22a (FIG. 2) to contact the memory medium, and so that the repulsive force applied by the memory medium to the needle tip is less than which causes significant wear to the needle tip.

Figure 3A:
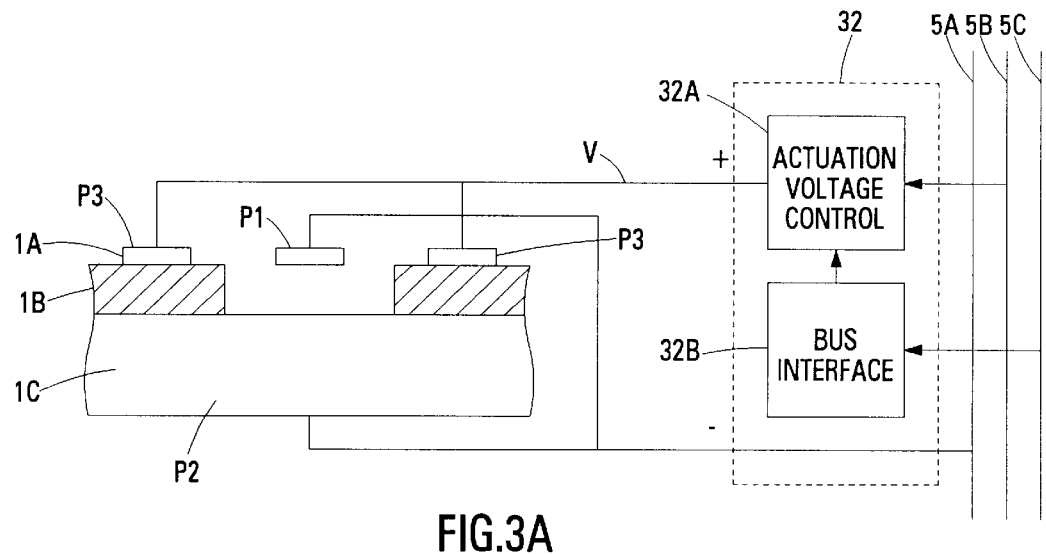
FIG. 3A shows how the electrodes and the probe driving circuit of each probe are electrically interconnected in an embodiment in which the probes are actuated by a repulsive force.
Figure 3B:
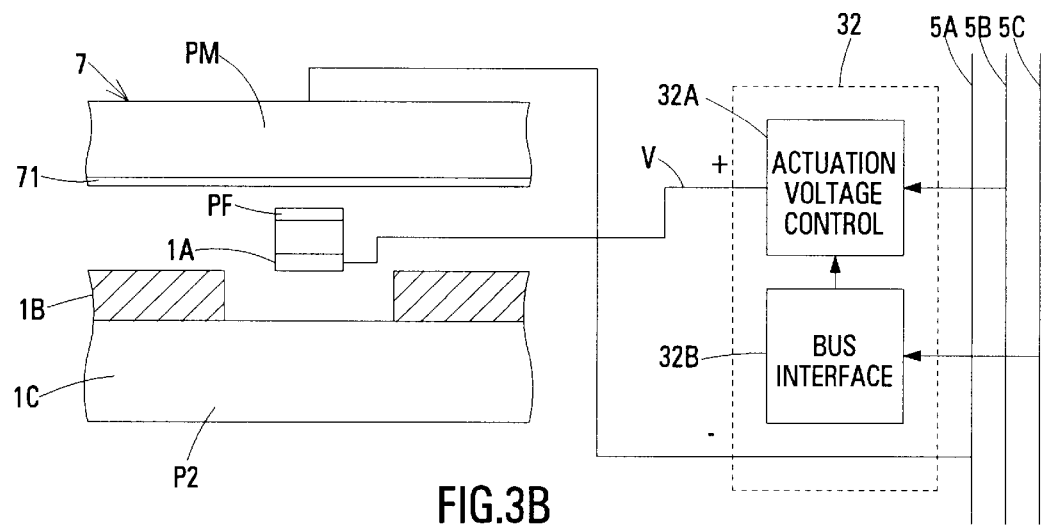
FIG. 3B shows how the electrode fins of each probe and the electrode provided by the memory substrate are electrically connected to the probe driving circuit in an embodiment in which the probes are actuated by an attractive force.
Figure 4:
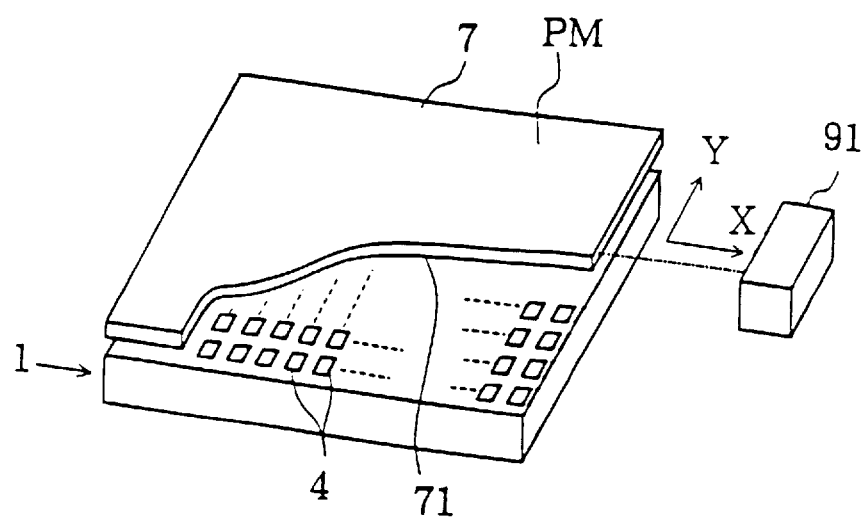
FIG. 4 shows an outline of the memory device of the invention.

The memory device according to the invention is shown in FIG. 4. The memory device includes the memory substrate 7 together with the probe device 1 described above with reference to FIGS. 1, 2, 3A and 3B, or the probe devices that will be described below with reference to FIGS. 5–8 and 19–22. A portion of the memory substrate 7 is cut away in the figure to show the surface of the probe device. The memory medium 71 constitutes the surface layer of the memory substrate facing the probe device.

The memory device will now be described in further detail with reference to FIGS. 1, 2 and 4. An array of probe cells 4 is located on the probe device 1 facing the memory medium 71 on the memory substrate 7. The probe cells each include a probe 2 that supports a conductive needle 22. The positioning device 91 is coupled to the probe device and the memory substrate to simultaneously position the conductive needles of all the probe cells in desired positions on the memory medium. The positioning device need provide no more relative movement between the probe device and the memory substrate than the spacing between the conductive needles of adjacent probe cells.

FIG. 4 shows an embodiment in which the positioning device 91 effects positioning by moving the memory substrate 7 in the X- and Y-directions. However, the positioning device could alternatively effect positioning by moving the probe device 1 in the X- and Y-directions. As a further alternative, the positioning device could effect positioning by moving the memory substrate 7 in the X-direction, and moving the probe device 1 in the Y-direction. Finally, the positioning device 91 is shown in FIG. 4 in conceptual terms, and differs from an actual positioning device.

In the memory device according to the invention, the memory substrate 7 can operate as an electrode that interacts with the probes 2 by electrostatic force. In such embodiments, the probes are actuated by an attractive electrostatic force exerted between each of the probes and the memory substrate 7. An attractive electrostatic force usually provides a desired actuation using a smaller probe actuation voltage than a repulsive electrostatic force applied using the electrode arrangement shown in FIGS. 1 and 3A. However, in embodiments in which the main body 21 of each probe has the structure shown in FIGS. 1 and 2, the W/R circuit 31 and probe driving circuit 32 of each probe cell 4 are ordinarily formed in the substrate layer 1C. Elements of the circuits project from the substrate surface S of the probe device 1. This requires that the memory substrate 7 be mounted with the memory medium 71 at an increased distance from the probe device to accommodate the height of the circuit elements above the substrate surface. This increases the distance between the probe main bodies 21 and the memory substrate 7 so that the desired probe actuation sometimes cannot be accomplished if the probes 2 are driven using an attractive electrostatic force exerted between the probe bodies and the memory substrate.

Figure 5:
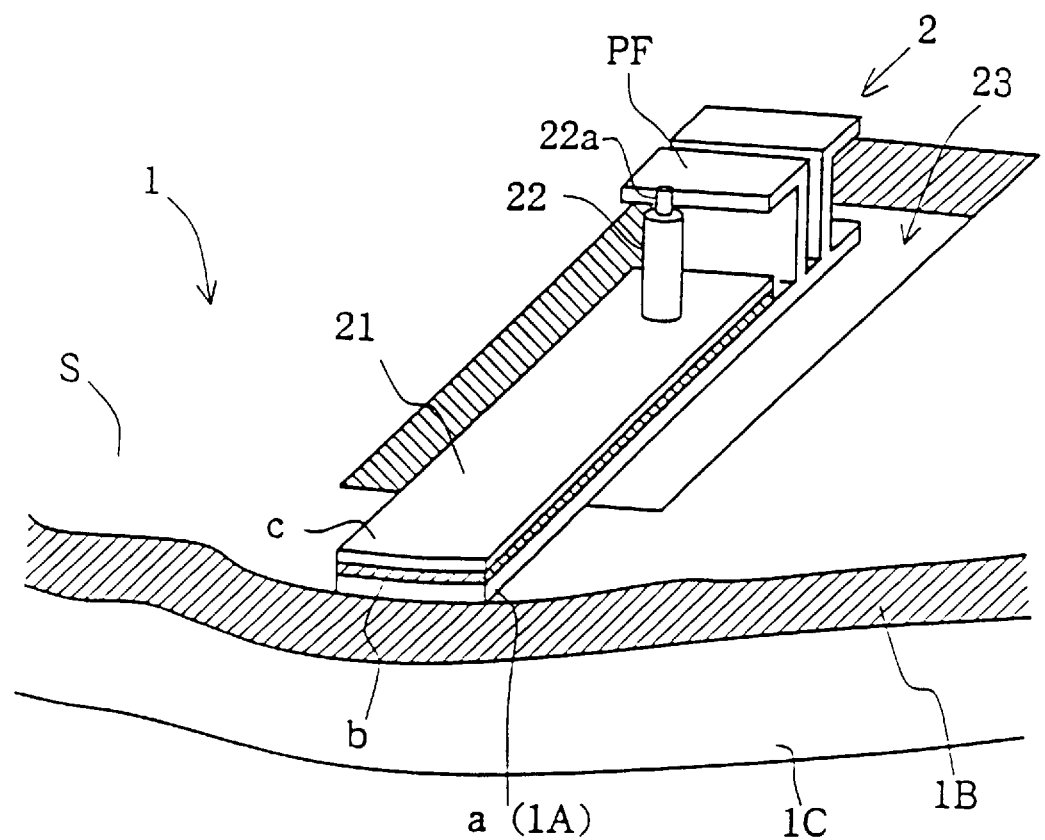
FIG. 5 shows an embodiment in which electrode fins are installed on the probe shown in FIG. 2.

FIG. 5 shows an embodiment of a probe 2 that is suitable for use in the above-described probe device 1 and that overcomes the difficulty just described. The probe 2 shown in FIG. 5 has an auxiliary electrode PF formed at the end of the probe main body 21 remote from the attachment between the probe main body and the substrate surface S. The auxiliary electrode includes an element, called a "fin," disposed parallel to the substrate surface and, hence, to the probe main body, and offset towards the memory medium 71 at a prescribed height above the probe main body. Such an auxiliary electrode will from now on be called an "electrode fin." In this embodiment, auxiliary electrodes similar to the auxiliary electrodes P3, P3 shown in FIG. 2 are not required. Instead, the probe is actuated by an attractive electrostatic force exerted between the electrode fins PF and the electrode PM (shown in FIG. 4) provided by the memory substrate 7. By mounting electrode fins PF on the probe main body, the probe 2 can be actuated by a small probe actuation voltage.

In the probe shown in FIG. 5, as in the probe shown in FIG. 2, the main body 21 of the probe 2 is composed of the semiconductor layer (a), the insulating layer (b), and the metal wiring layer (c) formed on the upper surface of the insulating layer. The semiconductor layer electrically interconnects the electrode fins PF to the output terminal of the probe driving circuit 32 associated with the probe. The wiring layer electrically interconnects the conductive needle 22 to the W/R circuit 31 associated with the probe.

FIG. 3B shows the way in which the electrode fins PF and the electrode PM are connected to the probe driving circuit 32 when the probes 2 are actuated by an attractive electrostatic force. In each probe cell 4, the electrode fins PF mounted on the probe 2 are electrically connected to the positive output terminal of the probe driving circuit of the probe cell. In addition, the negative output terminals of the probe driving circuits of all the probe cells are connected to the electrode PM on the memory substrate 7. The probe driving circuit applies a predetermined probe actuation voltage V between the electrode fin and the electrode PM to actuate the probe.

FIGS. 3A and 3B also show an example of a probe driving circuit 32 that generates the probe actuation voltage V suitable for actuating the probes 2. The probe driving circuit is the same in both figures. However, the connections between the probe driving circuit and the various electrodes differs, depending on whether the probe is actuated by an attractive electrostatic force or a repulsive electrostatic force, as described above in earlier descriptions of these Figures.

The probe driving circuit 32 shown in FIG. 3B will be described. The probe driving circuit is composed of the bus interface circuit 32B and the actuation voltage control circuit 32A. The actuation voltage control circuit has output terminals connected to the electrode fins PF and the electrode PM. The bus monitor circuit is connected to the bus line 5 and has an output connected to the actuation voltage control circuit.

The bus line 5 includes three bus line elements, the ground bus line 5A, power supply bus line 5B and the data bus line 5C. Actuation information, such as the addresses of the probes that are to be actuated, is sent to the probe driving circuits attached to the bus line via the data bus line 5C. The probe address information indicates the addresses of the probes attached to the bus line 5 that are to be actuated on the next read or write cycle. Clock information indicating the start and end of each read and write cycle is also sent to the probe driving circuits via the data bus line 5C. To simplify the following explanation, the term "cycle" will be used to refer to a read cycle or a write cycle.

In the probe driving circuit 32, the bus interface circuit 32B monitors the data bus line 5C and receives the actuation information indicating whether the probe 2 associated with the probe driving circuit 32 is to be actuated in the next cycle. If the probe associated with the probe driving circuit is to be actuated in the next cycle, the bus interface circuit feeds a control signal to the actuation voltage control circuit 32A when it receives the clock signal indicating the start of the cycle. The bus interface circuit stops feeding the control signal to the actuation voltage control circuit when it receives the clock signal indicating the end of the cycle. Alternatively, the bus interface circuit may feed the control signal to the actuation control circuit for a fixed time that begins when it receives the clock signal indicating the start of the cycle.

The actuation voltage control circuit 32A receives the power supply voltage from the power supply bus line 5B and, in response to the control signal from the bus interface circuit 32B, derives the probe actuation voltage V from the power supply voltage. The probe drive actuation V may be a quasi-static voltage that remains at a static value close to zero volts when the probe is not actuated, and changes to a static value different from zero volts while the actuation voltage control circuit receives the control signal from the bus interface circuit.

Although acceptable results can be obtained when the actuation voltage control circuit 32A generates a quasi-static probe actuation voltage, the actuation voltage control circuit preferably generates a probe actuation voltage V that changes dynamically during actuation of the probe. When the probe is not actuated, the actuation voltage control circuit may set the probe actuation voltage to a static value close to zero volts. When the control signal from the bus interface circuit 32B indicates the start of a cycle, the actuation voltage control circuit changes the probe actuation voltage to a value different from zero. The value of the probe actuation voltage V preferably changes dynamically during the cycle in a way that takes account of the changing distance between the electrode fin PF and the electrode PM during actuation of the probe 2. For example, immediately after it receives the control signal from the bus interface circuit 32B, the actuation voltage control circuit 32A may cause the probe actuation voltage to change initially to a relatively large value. The large value takes account of the initial relatively large spacing between the electrode fin and the electrode PM, and the mechanical inertia of the probe. As the cycle progresses, the actuation voltage control circuit reduces the probe actuation voltage in a predetermined, time-dependent manner to take account of the progressively-reducing distance between the electrode fin and the electrode PM. The actuation voltage control circuit reduces the probe actuation voltage over a time corresponding to the time required for needle tip 22a to move from its rest position into contact the memory medium 71. After this time has elapsed, the actuation voltage control circuit holds the probe actuation voltage at a substantially constant value for the rest of the cycle. The substantially constant value of the probe actuation voltage is that which applies such an actuation force to the probe that the repulsive force that the memory medium applies to the needle tip is below the that which causes significant wear on the needle tip.

If the probe is actuated by a repulsive electrostatic force generated by the probe driving circuit 32 shown in FIG. 3A, the way in which the probe actuation voltage V changes during the cycle is different from that just described. This is because the repulsive actuation force generated by a given probe actuation voltage decreases as the needle tip 22a approaches the memory medium 71.

Regardless of whether the probe actuation voltage V generated by the probe driving circuit 32 is quasi-static or dynamic, the probe driving circuit is an open-loop circuit. Using an open-loop probe driving circuit 32 to generate the probe actuation voltage considerably simplifies the probe driving circuit 32 compared with that of a conventional probe-based memory device. Since the probe driving circuit is an open-loop circuit, it lacks such circuit elements as a probe distance detector circuit that detects the distance between the needle tip and the memory surface, or a probe force detection circuit that detects the force applied to the surface of the memory medium by the probe tip. The probe driving circuits of conventional memory devices require such circuit elements to actuate the probe in such a manner that the probe reads and writes information in the memory medium with insignificant wear of the needle tip.

The memory device according to the invention can successfully and reliably read and write information in the memory medium 71 with insignificant wear of the needle tip 22a by using the open-loop probe driving circuit 32 that is considerably simpler than that of conventional probe-based memory devices because (a) the probe 2 is actuated to bring the needle tip into contact with the memory medium to read and write information in the memory device according to the invention; (b) the micromachining process by which the probe main body 21 is made enables the dimensions of the probe main body to be controlled accurately; (c) the Young's modulus of single-crystal silicon is consistent and repeatable; (d) the variations in dimensions and Young's modulus between the probe bodies of all the probes of the probe device 1 are very small; (e) the columnar shape of the needle tip 22a ensures that the repulsive force that the memory medium exerts on the needle tip is shared among a consistent number of atoms as the needle tip wears; and (f) in embodiments employing actuation by an attractive electrostatic force, the electrode fins reduce the spacing between the electrodes that exert the electrostatic force.

Figure 3C:
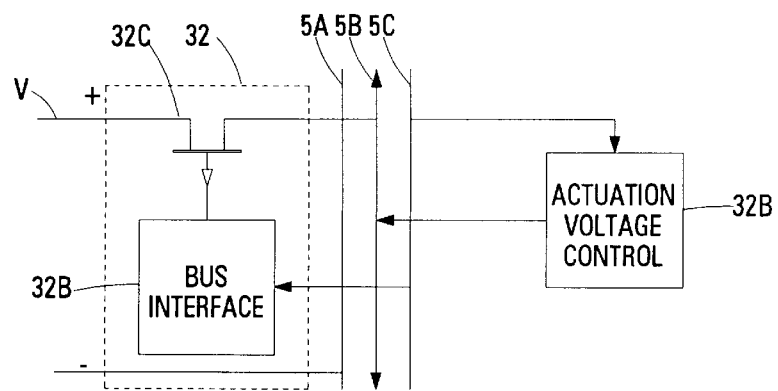
FIG. 3C shows an alternative embodiment of the probe driving circuit.

Since the probe driving circuits 32 of multiple probe cells 4 are connected to the common bus 5, the probe driving circuit 32 of each probe cell can be further simplified, as shown in FIG. 3C. The circuit shown in FIG. 3C can be connected to the electrodes P1, P2, P3 and P3, as shown in FIG. 3A, or can be connected to the electrode fin PF and the electrode PM, as shown in FIG. 3B.

In the probe driving circuit 32 shown in FIG. 3C, the actuation voltage source 32D generates a common actuation voltage that is distributed via the actuation voltage bus line 5D to all the probe cells connected to the bus line 5. If the probe actuation voltage is quasi-static, the actuation voltage source is simply a DC power supply that generates a DC voltage of the appropriate value. If the probe actuation voltage is dynamic, the actuation voltage source generates a varying probe actuation voltage for each cycle in response to a clock signal received from the data bus line 5C in a manner similar to that described above with respect to FIG. 3B.

Making the actuating voltage source 32D common to all the probe cells 4 connected to the bus line 5 enables the probe driving circuit 32 of each probe cell to be further simplified. With a common actuating voltage source, the probe driving circuit of each probe cell is only composed of the bus interface circuit 32B and the switch 32C. The bus interface circuit generates a control signal as described above. The control signal controls the switch. When the bus interface circuit generates no control signal, the switch 32C is turned OFF. Consequently, the probe actuation voltage V is not applied to the electrodes, and the probe 2 stays in its rest position, with the needle tip 22a separated from the memory medium 71. When the bus interface circuit generates the control signal, this turns the switch 32C ON, which applies the probe actuation voltage to the electrodes. The probe actuation voltage actuates the probe to bring the needle tip into contact with the memory medium. The switch 32C is represented by an MOS transistor in FIG. 3C, but other suitable switching elements capable of being controlled by the bus interface circuit 32B can be used instead.

In the memory device according to the invention, the W/R circuits 31 and probe driving circuits 32 associated with each probe 2 are located in close proximity to the probe, as shown in FIG. 1. Accordingly, the length of the wiring interconnecting these circuits, especially the W/R circuits 31, and their respective probes is extremely short, so that the effects of stray capacitance and the susceptibility to noise pickup are almost negligible.

The probes 2 shown in FIGS. 1, 2 and 5 are elongate, single-beam cantilevers attached at one end to the substrate surface S. Consequently, they can twist about their long axes and bend about their attachment point in a plane parallel to the substrate surface. Such bending and twisting shifts the lateral positions of the needle tips 22a relative to the memory medium 71. This reduces the positional accuracy with which the information can be read and written in the memory medium. Additionally, the insulating layer (b) and the wiring layer (c) formed on the semiconductor layer (a) can introduce variations in the mechanical properties of the probe main body 21.

Figure 6:
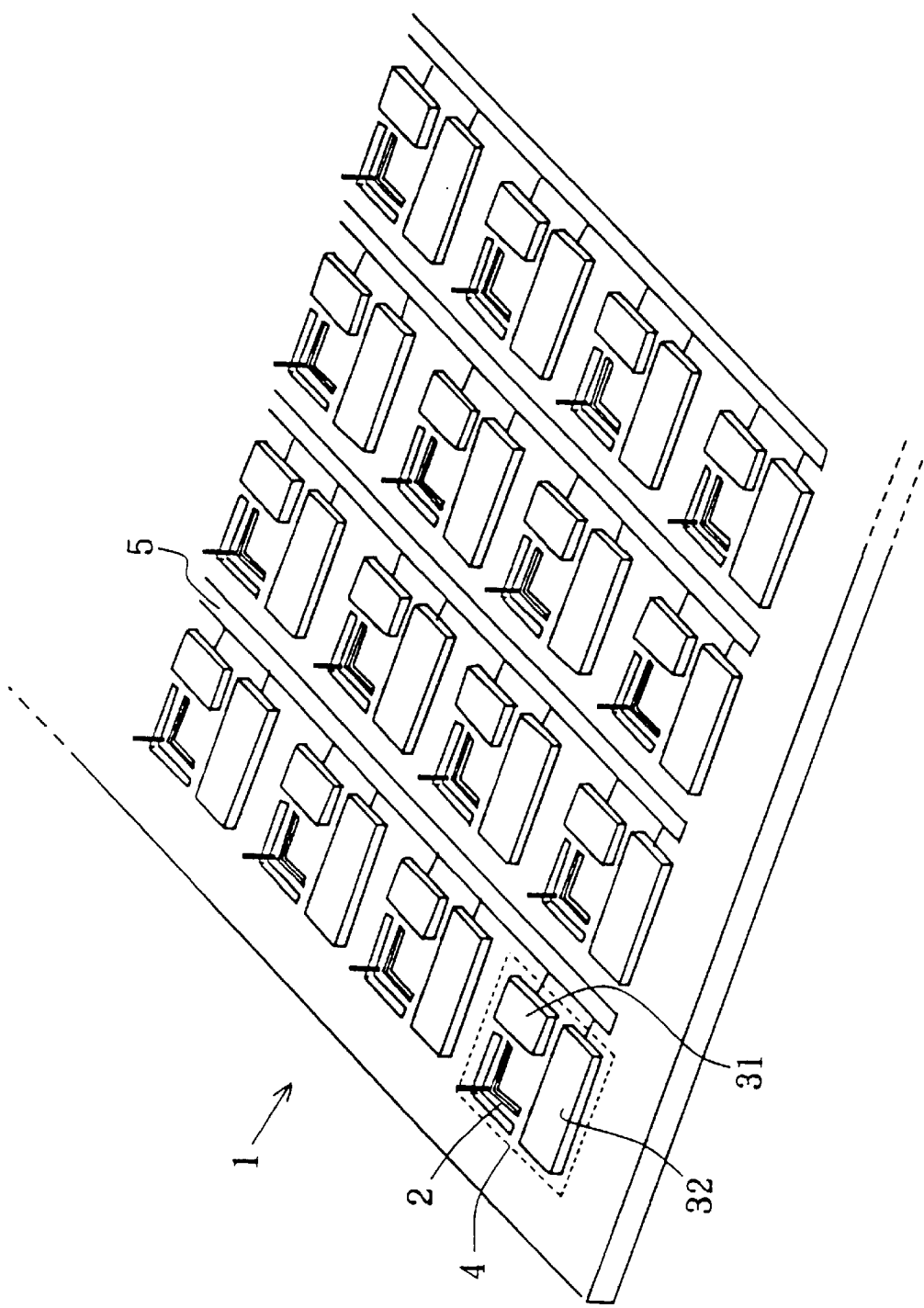
FIG. 6 shows a probe device used in the present invention, in which L-shaped cantilevers are used as probes.

FIG. 6 shows the probe device 1 that provides a solution to the problems just described. In the probe device shown in FIG. 6, the probes 2 each have an L-shaped cantilever probe main body. In the probe device shown in FIG. 6, probe cells 4, the bus lines 5, and the W/R circuits 31 and the probe driving circuits 32 constituting each of the probe cells are similar to the corresponding elements of the probe device 1 shown in FIG. 1, and will not be described again. However, the probes 2 differ in that they have L-shaped cantilever probe bodies 21. As in the embodiment of the probe device shown in FIG. 1, the elements of each probe cell and the bus lines are all formed by a monolithic semiconductor process.

Figure 7:
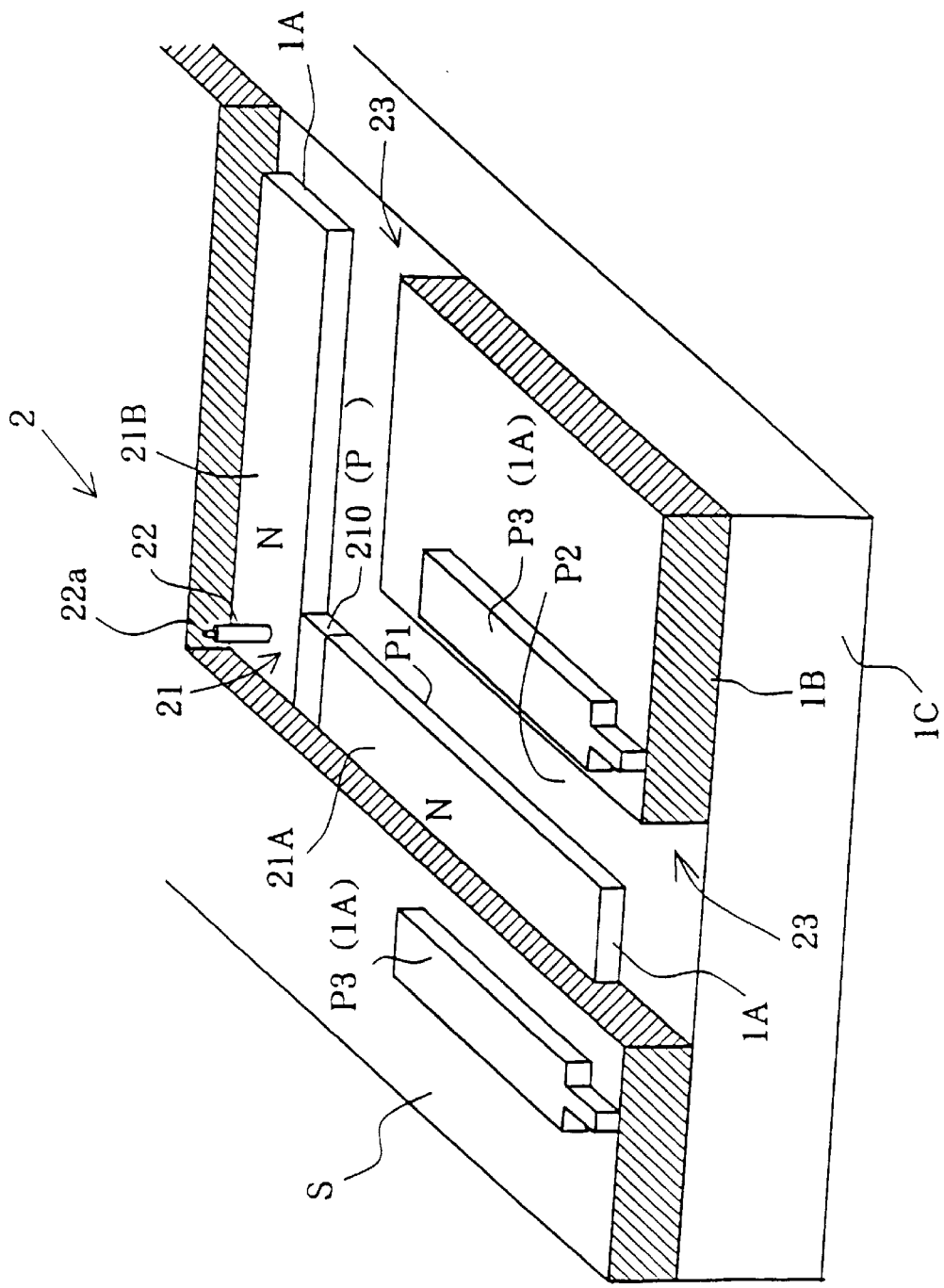
FIG. 7 is an enlarged view of one of the probes shown in FIG. 6.

FIG. 7 shows one of the probes 2 of the embodiment shown in FIG. 6 in more detail. The main body 21 of the probe 2 takes the form of an L-shaped cantilever composed of the first arm 21A and the second arm 21B disposed orthogonal to one another. One end of each arm is attached to the substrate surface S, although the attachment points are not shown in FIG. 7. The other ends of the arms are mechanically connected to one another.

The probe main body 21 is cantilevered over the L-shaped trough 23. The trough extends through in the insulating intermediate layer 1B of the composite wafer to expose the surface of the semiconductor substrate 1C at its bottom. The two arms 21A and 21B are formed from a single piece of the semiconductor surface layer 1A. In this example, the part of the semiconductor surface layer constituting the first and second arms 21A and 21B is doped with a donor (N-type) impurity to make the arms electrically conductive. Located at the junction between the arms is the small connecting region 210 that is doped with an acceptor (P-type) impurity. The p-type connecting region 210 mechanically interconnects, but electrically isolates, the first and second arms 21A and 21B.

In the embodiment shown in FIG. 7, the undersurface of the first arm 21A constitutes the driving electrode P1 for the probe 2. The conductive needle 22 is located at the end of the second arm 21B near the junction of the second arm with the first arm. The needle tip 22a is formed at the tip of the conductive needle 22 remote from the probe main body. The needle tip is columnar, i.e., in a plane parallel to the surface of the semiconductor surface layer, the needle tip has a uniform cross section along its length. When the probe is actuated by a repulsive electrostatic forced applied to the arm 21A, the needle tip 22a contacts the memory medium 71 FIG. 4).

In the embodiment shown in FIG. 7, the portion of the exposed surface of the semiconductor substrate 1C that faces the first arm 21A constitutes the second electrode P2. A pair of auxiliary electrodes P3, P3, is formed in the semiconductor surface layer 1A along opposite sides of the trough 23 near the first arm. The electrodes P1, P2 and P3 are connected to the probe driving circuit 32 shown in FIG. 6 in a manner similar to that described above with reference to FIG. 3A.

The conductive second arm 21B electrically connects the conductive needle 22 to the W/R circuit 31 shown in FIG. 6.

A positioning device similar to the positioning device 91 shown in FIG. 4 simultaneously positions all of the probes 2 shown in FIGS. 6 and 7 in prescribed positions on the memory medium 71. The probe driving circuits then apply a predetermined probe actuation voltage between the electrodes P1, P2 and P3 to actuate the probes by subjecting the probes to a repulsive electrostatic force. The repulsive electrostatic force actuating the probes brings the needle tips 22a into contact with the memory medium 71.

In the probes 2 shown in FIGS. 6 and 7, the conductive needle 22 is attached to the substrate surface S by the L-shaped cantilever of the probe main body 21. The probe main body is composed of the two orthogonally-disposed arms 21A and 21B. Each of the arms 21A and 21B stabilizes the other against twisting about its longitudinal axis and against bending about its point of attachment in a plane parallel to the substrate surface S. The conductive needle 22 of each probe 2 can move vertically relative to the surface of the memory medium 71 in response to the probe actuation force. However, the conductive needle constrained from moving horizontally relative to the memory medium because each of the arms 21A and 21B prevents the other from twisting and bending. Thus, the needle tips 22a of the conductive needles 22 are accurately positioned relative to the surface of the memory medium.

Figure 8:
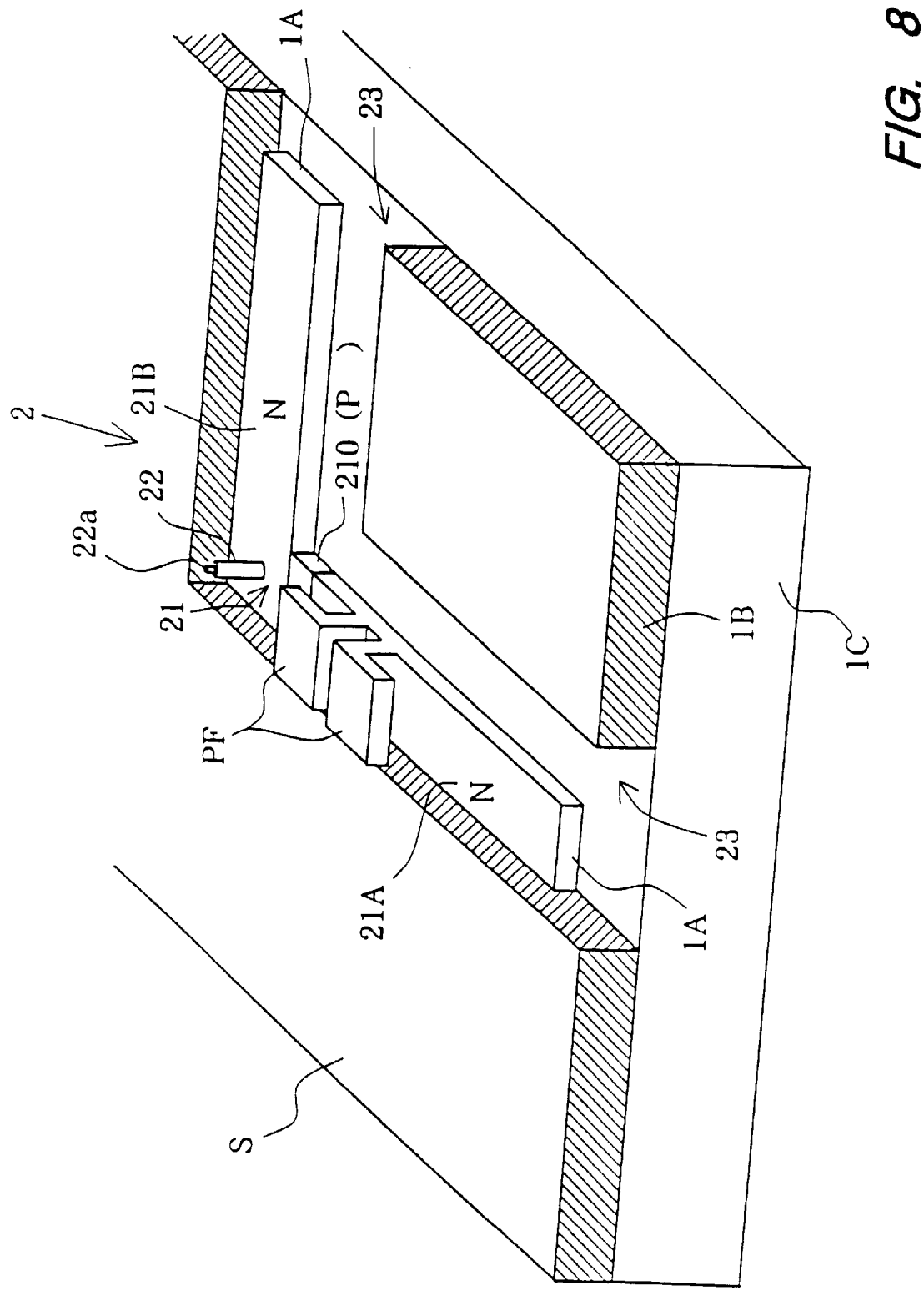
FIG. 8 illustrates an embodiment in which electrode fins are installed on the probe shown in FIG. 7.

The probes 2 shown in FIGS. 6 and 7 can be actuated by an attractive electrostatic force applied between electrode fins PF mounted on the probe main body and the memory substrate 7 (FIG. 4) serving as an electrode PM. FIG. 8 shows the electrode fins PF located near the end of the first arm 21A near the junction between the first arm and the second arm 21B. In this embodiment, auxiliary electrodes similar to the auxiliary electrodes P3, P3 shown in FIG. 7 are not required. Instead, the probe is actuated by an attractive electrostatic force exerted between the electrode fins PF and the electrode PM provided by the memory substrate 7. The electrode fins and the electrode PM are connected to the probe driving circuit 32 in a configuration similar to that shown in FIG. 3B. However, in the embodiment show in FIG. 8, the conductive arm 21A electrically connects the positive output terminal of the probe driving circuit to the electrode fins PF.

In a memory device using the probes 2 shown in FIGS. 7 and 8, as in the memory device using the probes 2 shown in FIGS. 2 and 5, the W/R circuits 31 and probe driving circuits 32 associated with each probe 2 are located in close proximity to the probe 2. Accordingly, the length of the wiring connected to these circuits, especially between the W/R circuits 31 and their respective probes is extremely short, so that the effects of stray capacitance and the susceptibility to noise pickup are almost negligible.

In the memory device using the probes 2 shown in FIGS. 7 and 8, the second arm 21B of each probe is spatially separated from, and is disposed orthogonally to, the first arm 21A. Accordingly, noise coupling through the stray capacitance between the first arm and the second arm, which electrically connects the conductive needle 22 to the W/R circuit 31, can be virtually ignored.

A probe main body 21 having a laminated structure, such as that shown in FIGS. 2 and 5, is susceptible to warping as a result of thermal expansion and contraction that occurs during fabrication. The warping may be so severe as to render the probe unusable. Moreover, as noted above, the insulating and metal wiring layers cause the mechanical properties of the laminated probe main body to be less consistent than those of a probe main body fabricated from silicon alone. The probe main bodies shown in FIGS. 7 and 8 have a single-layer structure, and therefore suffer from no warping that would cause problems in practical use. Moreover, these probe bodies have more consistent mechanical properties than the above-mentioned laminated probe bodies because of their single-layer construction. In addition, the probes shown in FIGS. 7 and 8 have all of the advantages of the probes shown in FIGS. 1, 2 and 5.

In a practical embodiment of the probe shown in FIG. 8, the arms 21A and 21B had a length in the range 20–30 microns and were about 1 micron wide and 0.5 microns thick. The conductive needle 22 was about 0.5 micron in diameter and had a height of 0.5 micron. The needle tip was a column about 0.1 micron in diameter with a height of 0.2 micron. The probe was actuated by a voltage of about 5 V that could be controlled conveniently using conventional CMOS circuits.

An example of a process that can be used to fabricate the probes 2 shown in FIG. 8 and their associated probe driving circuits will be described next with reference to FIGS. 9 through 18. In the preferred embodiment, the probe driving circuits are preferably formed using CMOS transistors. The following description describes how the process is used to fabricate a single probe and two CMOS transistors associated with the probe. The single probe is one of typically many thousand probes simultaneously fabricated by the process. Each CMOS transistor represents the CMOS transistors that constitute the probe driving circuit associated with the probe. The process fabricates the many CMOS transistors simultaneously with one another and with their respective probes.

Step 1-1. A silicon on insulator (SOI) wafer, composed of the semiconductor surface layer 1A, the insulating intermediate layer 1B, and the semiconductor substrate 1C, is provided. The SOI wafer may be manufactured using known SOI techniques such as wafer bonding, and is not a special type of wafer.

Figure 9:
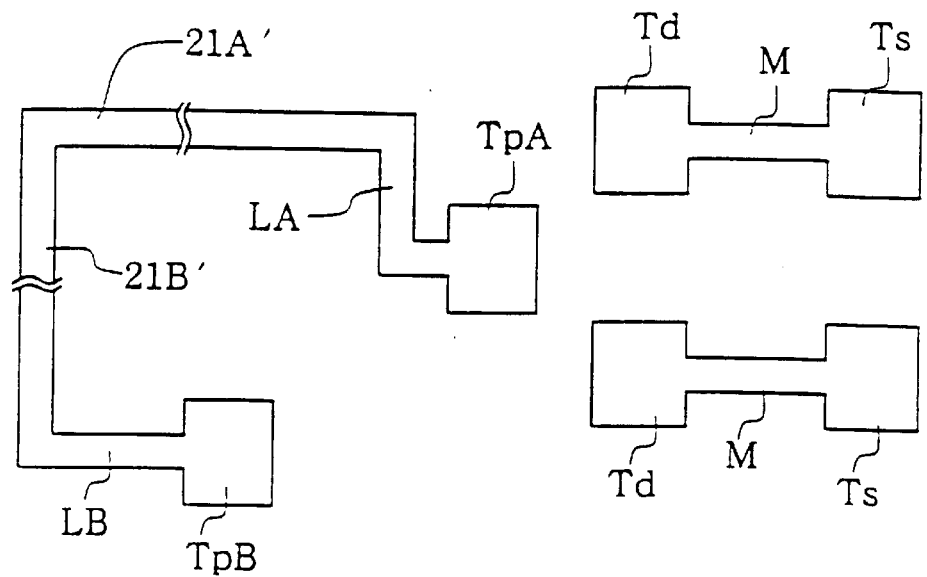
FIG. 9 shows the probe after the probe fabrication process steps 1-1 and 1-2 have been performed.

Step 1-2. As shown in FIG. 9, portions of the semiconductor surface layer 1A are selectively removed to define the following elements:

(a) the integral portions 21A' and 21B' that will form the first and second arms 21A and 21B of the probe main body 21, (b) the terminals TpA and TpB connected to the portions 21A' and 21B', (c) wiring LA that connects the portion 21 A' to the terminal TpA, (d) wiring LB that connects the portion 21B' to the terminal TpB, (e) the portions that form the silicon substrate M, and the drain and source terminals Td and Ts of CMOS transistors representing the probe driving circuit.

As will be described below, the probe driving circuits in the preferred embodiment of the invention are constructed from CMOS devices, and are formed by patterning of the semiconductor surface layer 1A.

Figure 10:
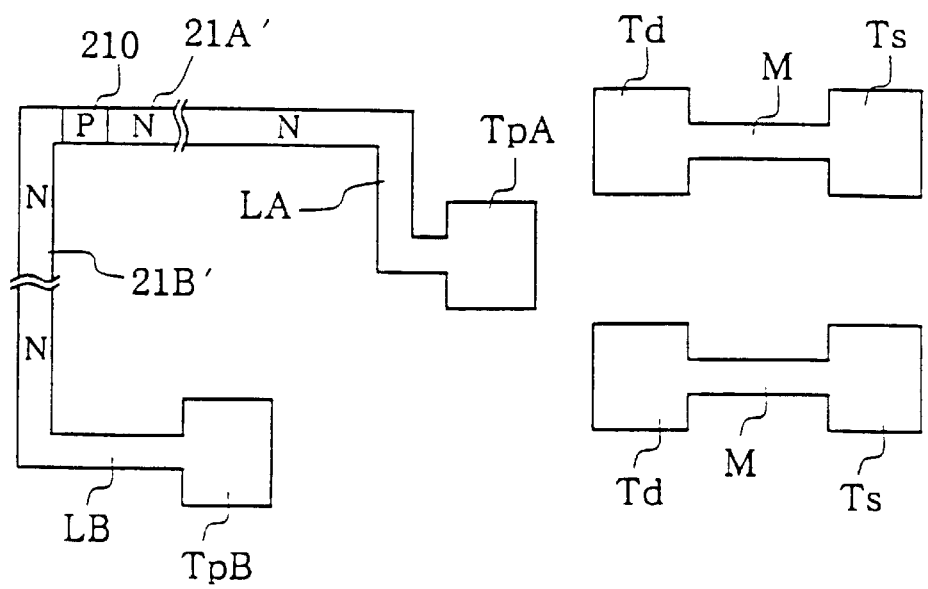
FIG. 10 shows the probe after the probe fabrication process step 1-3 has been performed.

Step 1-3. N-type and P-type regions, where the P-type regions correspond to the P-type connecting region 210 shown in FIG. 10, are formed in the portions 21A' and 21B' by ion implantation. The impurity concentration ion implanted into the N-type regions is sufficiently high to provide a conductivity high enough for the N-type regions to operate as wiring. Typically, the impurity concentration is in the range of $10^{17}$ to $10^{18}$ atoms/cm$^3$.

The impurity concentration ion implanted to form the P-type region 210 is that which forms two back-to-back P-N junctions that electrically insulate the portions 21A' and 21B from one another. Typically, the impurity concentration is about $10^{18}$ atoms/cm$^3$. Impurity concentrations in the respective regions higher than the above values may cause warping in the probe main body, but impurity concentrations of approximately the values set forth above will provide acceptable conductivity and insulation without unacceptable warping of the probe main body. FIG. 10 shows the surface of the semiconductor surface layer following the ion implantation.

Step 1-4. The CMOS gate oxide films are formed.

Step 1-5. A layer of polysilicon, for example, is deposited by low pressure chemical vapor deposition (LPCVD) on the wafer. The polysilicon forms the layer in which the gate electrodes of the CMOS devices of the circuits will be defined. Additionally, doping is performed in the CMOS silicon substrate portions M.

Figure 11A:
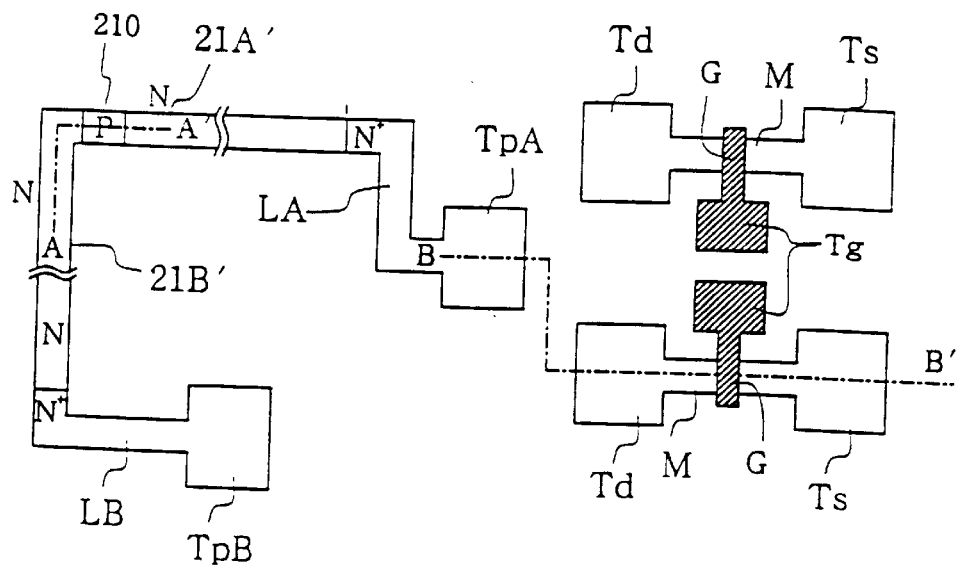
FIGS. 11A–11C show the probe after the probe fabrication process steps 1-5 and 1-6 have been performed.
Figure 11B:
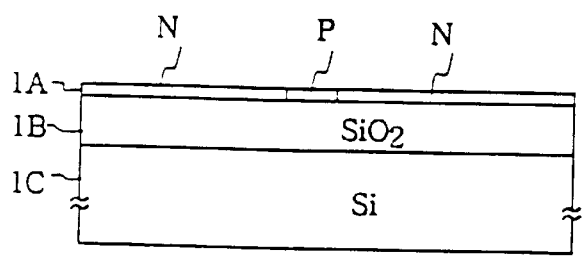
Figure 11C:
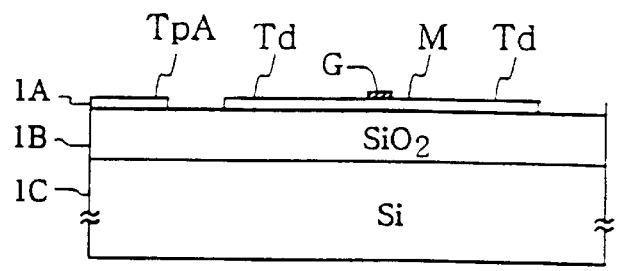

Step 1-6. The polysilicon layer is patterned to define the gate electrodes G and the gate terminals Tg of the gate electrodes of the CMOS devices. All of the polysilicon layer is removed except for the gate electrodes G and gate terminals Tg. When the N+ diffusion for the gate and drain of each CMOS device is formed, the wiring portions LA and LB are also exposed to this diffusion, which converts them into N+ regions. This provides a low resistance electrical contact between the probe main body 21 and the metal wiring that will formed in Step 1-20, to be described below. FIG. 11A shows the conditions of doping of the probe main body 21 following the N+ diffusion. FIG. 11B is a cross sectional view along line A–A' in FIG. 11A, and FIG. 11C is a cross sectional view along line B–B' in FIG. 11A.

Step 1-7. An SiO$_2$ layer (d) is deposited on the wafer to a thickness of, for example, approximately 0.4 microns.

Figure 12:
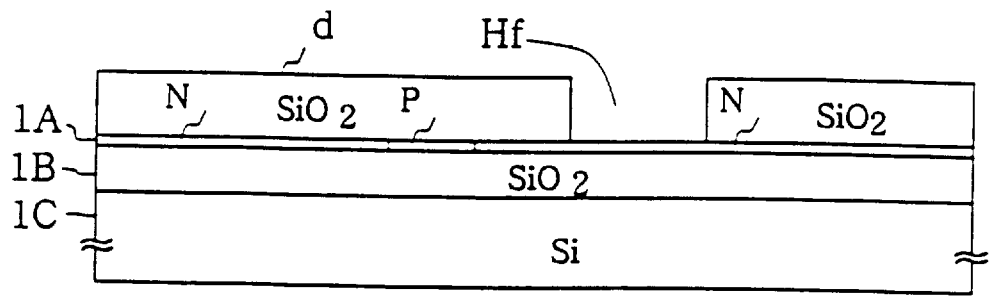
FIG. 12 shows the probe after the probe fabrication process steps 1-7 and 1-8 have been performed.

Step 1-6. A hole Hf with a width of, for example, approximately 0.44 microns is opened in the area where the electrode fins PF will be formed. FIG. 12 is a cross-sectional view along a line corresponding to line A–A' in FIG. 11A, and shows the probe after the hole Hf used to form the electrode fins PF has been opened.

Step 1-9. An N-type polysilicon layer (e) is deposited on the wafer to a thickness of, for example, approximately 0.1 microns.

Figure 13:
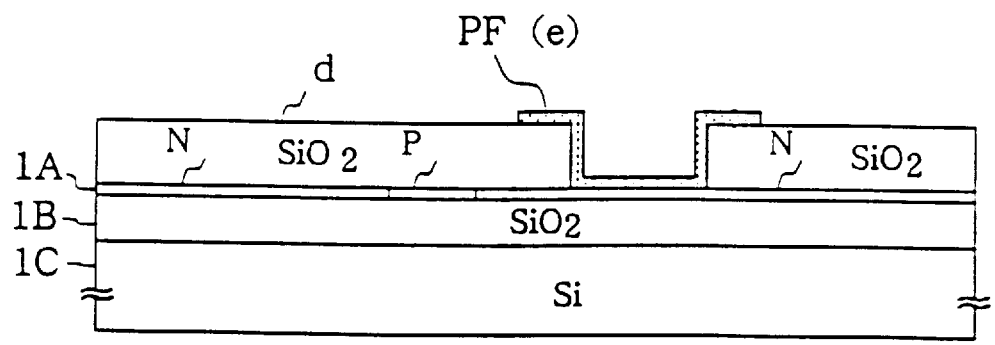
FIG. 13 shows the probe after the probe fabrication process steps 1-9 and 1-10 have been performed.

Step 1-10. The electrode fins PF are formed by patterning the N-type polysilicon layer (e). FIG. 13 is a sectional view along a line corresponding to the line A–A', and shows the probe after the polysilicon layer has been patterned to form the electrode fins PF.

Step 1-11. An SiO$_2$ layer (f) is deposited on the wafer to a thickness of, for example, approximately 0.2 microns.

Figure 14:
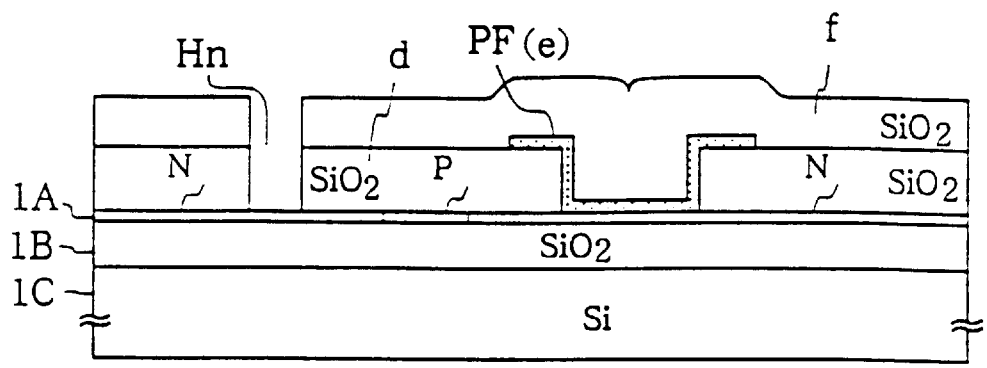
FIG. 14 shows the probe after the probe fabrication process steps 1-11 and 1-12 have been performed.

Step 1-12. A hole Hn with a diameter of, for example, approximately 0.2 microns is formed in the area where the conductive needle 22 will be formed. FIG. 14 is a sectional view along a line corresponding to the line A–A', and shows the probe after the hole Hn has been opened.

Step 1-13. An N-type polysilicon layer is deposited on the wafer to a thickness of, for example, approximately 0.15 microns.

Step 1-14. The N-type polysilicon layer is removed by etching to a depth of, for example, slightly more than 0.15 microns. This forms the conductive needle 22.

Step 1-15. A resist layer (g) is deposited on the wafer to a thickness of, for example, approximately 0.1 microns.

Figure 15:
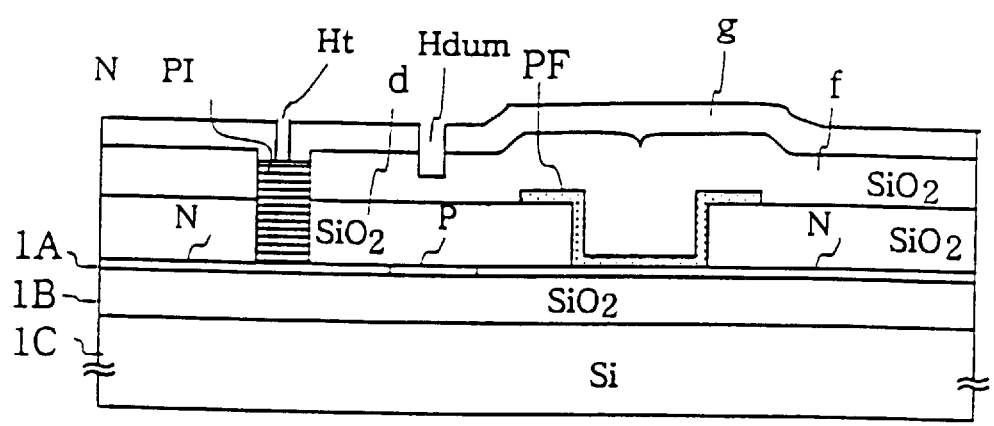
FIG. 15 shows the probe after the probe fabrication process steps 1-13 through 1-16 have been performed.

Step 1-16. A hole Ht with a prescribed diameter, e.g., approximately 30 nm in the preferred embodiment of the invention, is opened by, for example, electron beam lithography, ion beam lithography, or X-ray lithography in the portion of the resist layer (g) where the needle tip 22a of the conductive needle 22 will be formed. At the same time, at least one dummy hole Hdum is formed in an appropriate portion of the wafer in addition to the hole Ht. The dummy hole is formed to facilitate the lift-off process that will be described below. FIG. 15 is a cross-sectional view showing the probe after the holes Ht and Hdum have been opened.

Step 1-17. A layer (h) of the material of the needle tip 22a of the conductive needle 22 is deposited on the wafer to a thickness of approximately 50 nm. Specifically, the material of the layer (h) is one that will withstand the etchant used to etch the $SiO_2$ etched in Step 1-21. In the preferred embodiment of the invention, the layer (h) is a layer of iridium (Ir). The layer (h) is deposited using an anisotropic film deposition process. Depositing the layer (h) completes formation of the conductive needle 22.

Figure 16A:
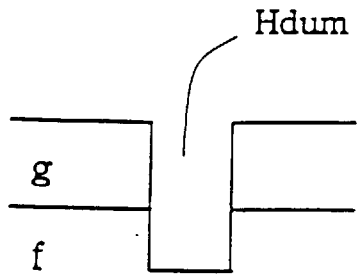
FIGS. 16A through 16D illustrate the lift-off process in probe fabrication process step 1-18.
Figure 16B:
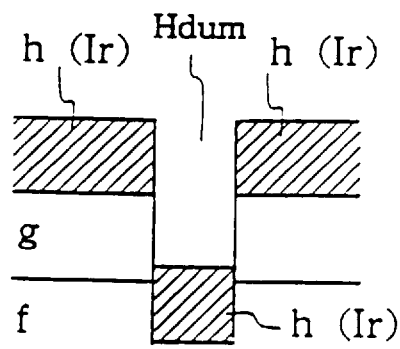
Figure 16C:
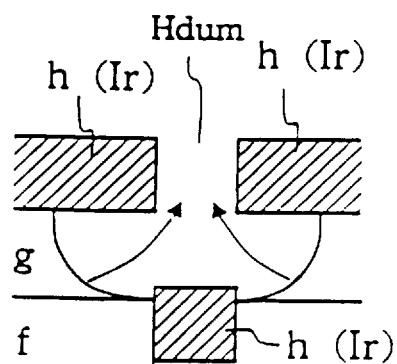
Figure 16D:
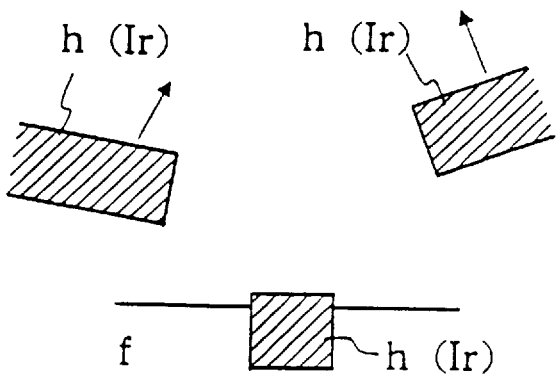
Figure 17:
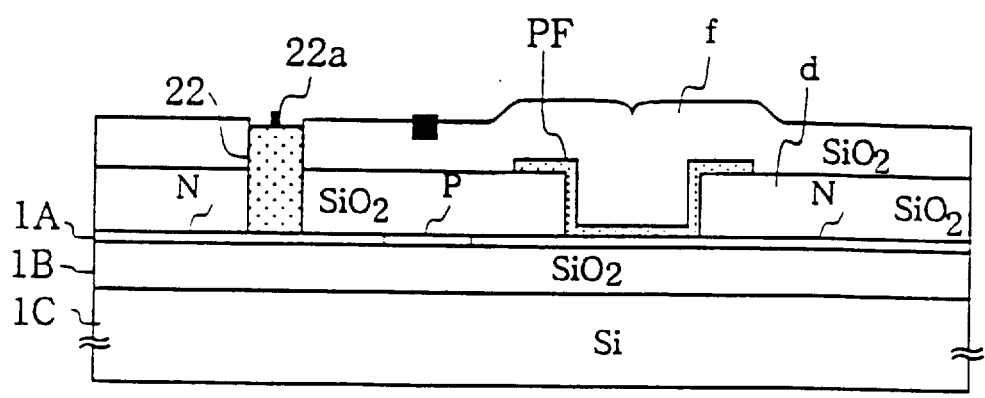
FIG. 17 shows the probe after the probe fabrication process steps 1-17 and 1-18 have been performed.

Step 1-18. The resist layer (g) is stripped away by means of a lift-off process. FIGS. 16A through 16D illustrate an example of the lift-off process. FIG. 16A shows the vicinity of the dummy hole Hdum opened in the resist layer (g) in Step 1-16 described above. FIG. 16B shows the probe after the Ir layer (h) has been deposited in Step 1-17 described above. Isotropic etching, such as that shown in FIG. 16C, is performed on the Ir layer (h) shown in FIG. 16B. This removes the resist layer (g), and the Ir layer (h) formed on the resist layer (g) is stripped away, as shown in FIG. 16D. FIG. 17 shows the probe after the lift-off process has been completed.

Step 1-19. An $SiO_2$ layer is deposited on the wafer to a thickness of, for example, approximately 0.1 microns.

Step 1-20. A conventional metallization process is performed to deposit metal selectively on the $SiO_2$ layer to form metal wiring.

Step 1-21. An etch process is performed to remove the $SiO_2$ insulating intermediate layer 1B underlying part of the probe main body 21 of the probe 2 to form the trough 23 (FIG. 8). This completes fabrication of the probe 2 shown in FIG. 8.

In the fabrication method illustrated in FIGS. 9 through 17, the probe 2 with an L-shaped cantilever was manufactured using an SOI wafer composed of the semiconductor surface layer 1A, the insulating intermediate layer 1B, and the semiconductor substrate 1C. However, the process that will be described next can be used to fabricate a similar probe with an L-shaped cantilever using a bulk wafer.

Step 2-1. Fabrication up to and including the formation of the CMOS gate electrodes of the probe driving circuit is accomplished using a conventional CMOS process. The probe region is left as the separating region between elements.

Step 2-2. A second polysilicon film, in which the probe main body 21 will be defined, is deposited on the wafer.

Step 2-3. Process steps similar to the steps 1-3 through 1-6 described above are performed on the second polysilicon film. In this case, the respective electrical connections between the portions which form the first and second arms 21A and 21B of the probe main body 21, and the W/R circuit 31 and probe driving circuit 32, are appropriately formed by a known method. For example, the second polysilicon film and the CMOS gate electrode wiring or N+ diffusion regions may be connected by direct contact holes, or may be wired via metal in a subsequent process.

Step 2-4. Processes similar to the steps 1-7 and subsequent process steps are performed. As a result, a probe 2 with an L-shaped cantilever is manufactured.

The above descriptions of process steps 1-1 through 1-21 and 2-1 through 2-4 focused the process steps used to form the probes and the probe driving circuits, and no description was given concerning the process steps used to form the W/R circuits or the buses. Furthermore, several process steps, such as channel ion injection, were omitted from the description. However, these process steps are known, and a person of ordinary skill in the art would know how and where to include them in the process description set forth above.

Figure 18A:
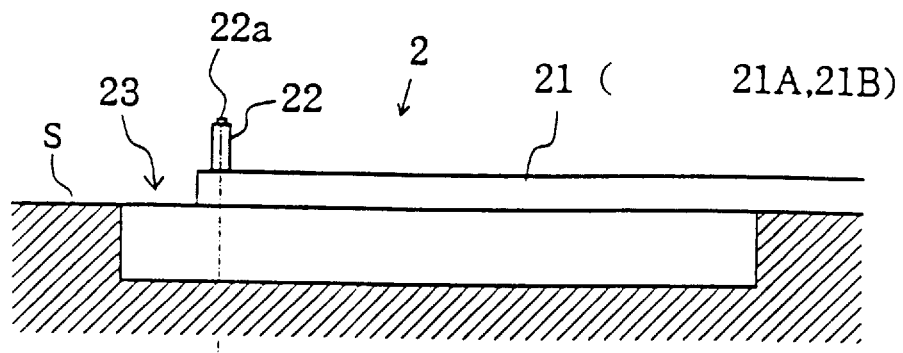
FIGS. 18A and 18B illustrate a problem encountered by conventional probes.
Figure 18B:
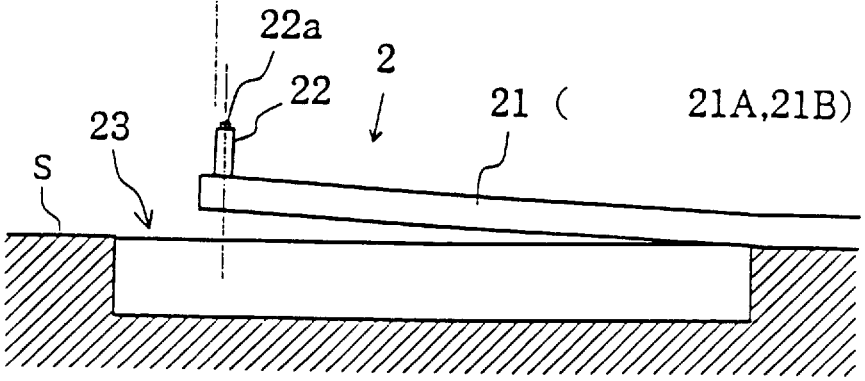
Figure 19:
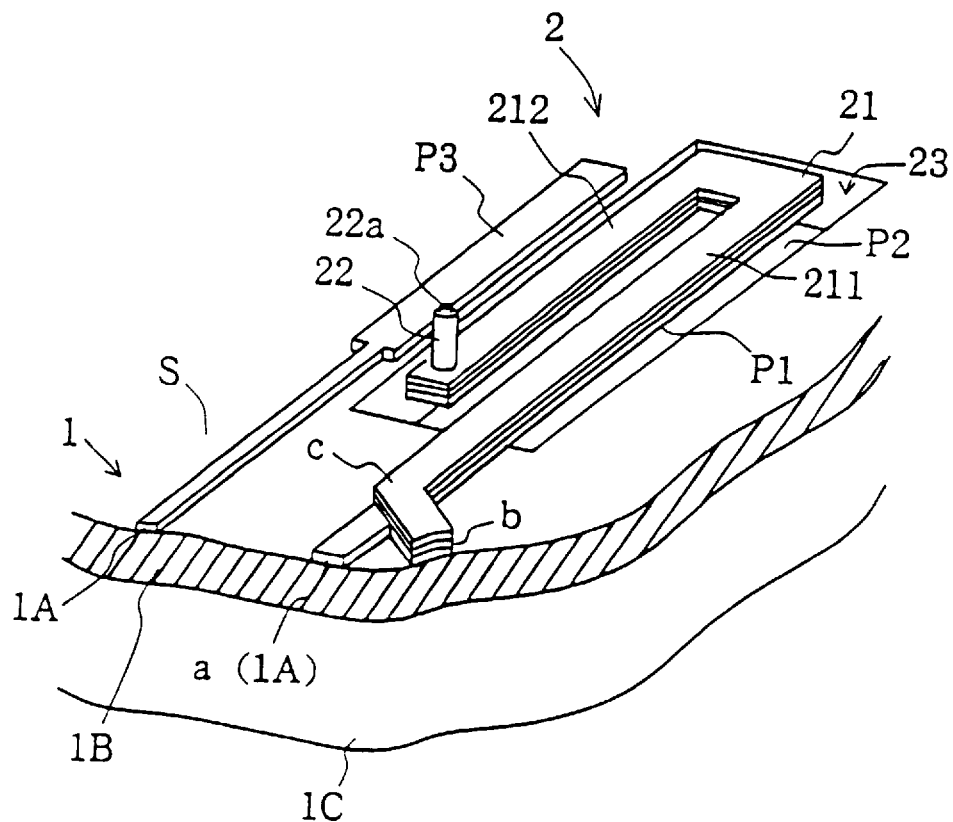
FIG. 19 illustrates a probe used in the invention which has the shape of a cantilever with a reverse bend.

FIGS. 18A and 18B show how the relative position between the needle tip 22a and the memory surface 71 (FIG. 4) may change when the probe 2 is actuated. FIG. 18A shows the probe 2 of FIG. 2 or 7 in its rest position, prior to being actuated. FIG. 18B shows the probe 2 after it has been driven away from the substrate surface S and towards the memory medium. This positional shift may be a problem in some circumstances. To overcome this problem, the probe main body 21 of the probe may be formed with a reverse bend, as shown in FIG. 19. The probe main body with the reverse bend is composed of the arms 211 and 212.

In the probe main body 21 shown in FIG. 19, one end of the arm 211 is attached to the substrate surface S of the probe device 1, and extends out over the trough 23. A bridging portion connects the end of the arm 211 remote from the attachment point to the substrate surface to one end of the arm 212. The conductive needle 22 is mounted on the end of the arm 212 remote from the bridging portion. The conductive needle extends away from the substrate surface, towards the memory substrate 7 (FIG. 4).

The probe 2 shown in FIG. 19 has a layered construction similar to that of the probe 2 shown in FIG. 2, except that the probe main body 21 of the probe 2 of FIG. 19 is formed with a reverse bend. The electrode P1 is located on the undersurfaces of the arms 211 and 212. The probe shown in FIG. 19 is driven by the probe driving circuit 32 shown in FIG. 3A.

Figure 20:
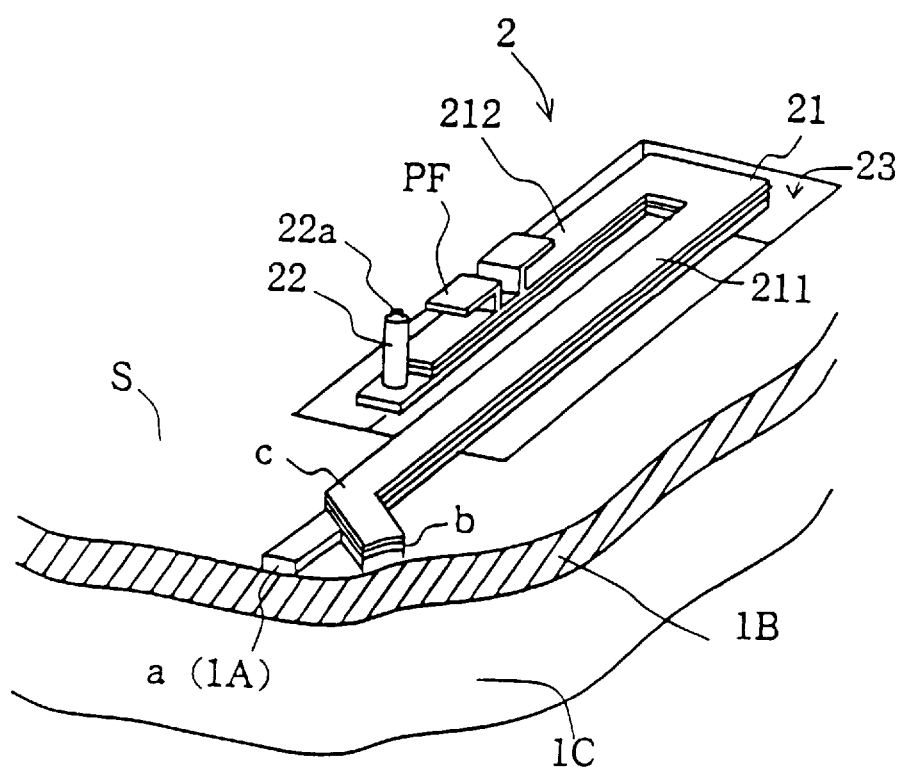
FIG. 20 illustrates an embodiment in which electrode fins are installed on one of the arms of the probe shown in FIG. 19.

FIG. 20 shows an embodiment in which electrode fins PF are formed on the arm 212 of the probe main body 21 shown in FIG. 19. The probe 2 shown in FIG. 20 has a layered construction similar to that of the probe 2 shown in FIG. 5, except that the probe main body 21 of the probe 2 of FIG. 20 is formed with a reverse bend. The probe shown in FIG. 20 is driven by the probe driving circuit 32 shown in FIG. 3B.

Figure 21:
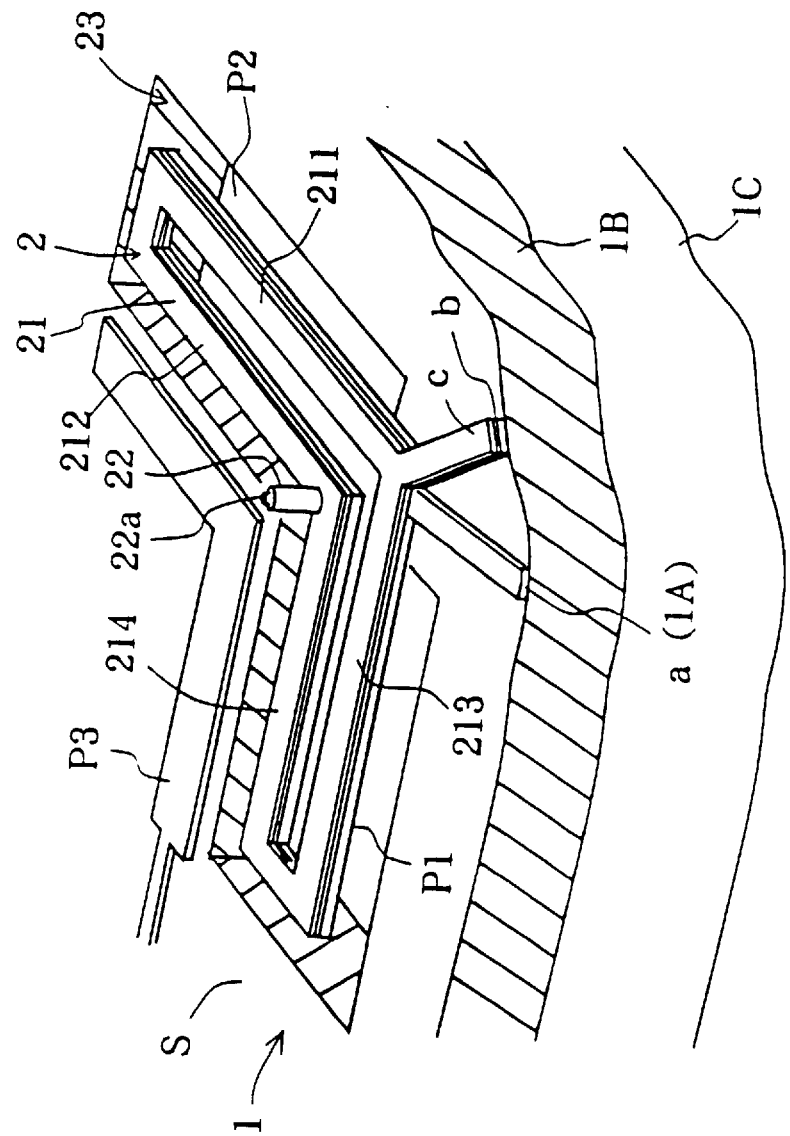
FIG. 21 illustrates a probe that is formed by joining the tip ends of the respective arms of a pair of the probes consisting of cantilevers with a reverse bend shown in FIG. 18.

FIG. 21 shows a probe 2 in which the conductive needle 22 is supported on a cantilever having a double reverse-bend structure. This structure is formed by joining the ends of the respective arms of a pair of orthogonally-disposed cantilevers with reverse bends, similar to those shown in FIG. 20. The probe main body 21 is composed of the arms 211, 212, 213 and 214 that extend over the trough 23, parallel to the substrate surface S. The arms 211 and 212 are disposed parallel to each other, and the arms 213 and 214 are disposed parallel to each other, and approximately orthogonal to the arms 211 and 212.

The apex of the L-shaped cantilever formed by the arms 211 and 213 is attached to the substrate surface S. The conductive needle 22 is attached to the apex of the L-shaped cantilever formed by the arms 212 and 214. The electrode P1 is located on the undersurfaces of the arms 211 through 214. The metal wiring layer (c), which connects the conductive needle 22 to the W/R circuit, is formed on the upper surface of the arms 211 through 214. With the cantilever structure shown in FIG. 21, the position of the needle tip 22a is very well defined relative to the surface of the memory medium. The L-shaped cantilever prevents the position of the needle tip from varying in the plane parallel to the surface of the memory medium due to the cantilever twisting, and the reverse-bend structure prevents the position of the needle tip from varying in the plane parallel to the surface of the memory medium as the cantilever bends in response to the actuation force. The probe shown in FIG. 21 is driven by the probe driving circuit 32 shown in FIG. 3A.

Figure 22:
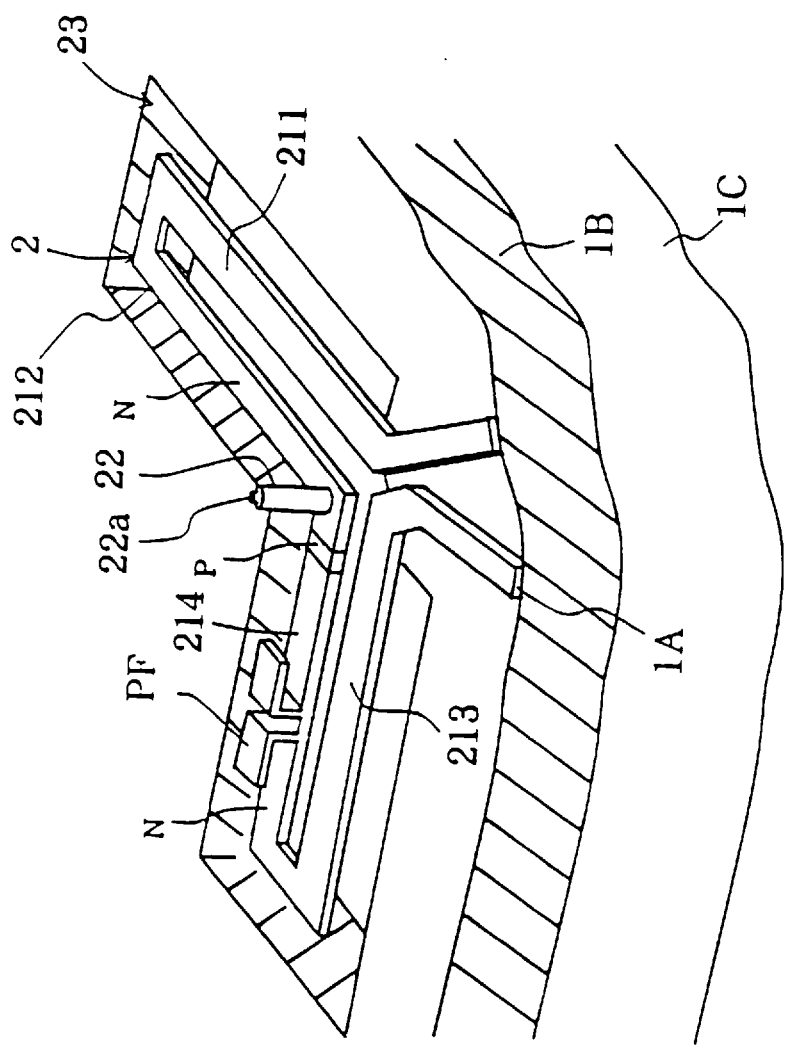
FIG. 22 shows a probe with electrode fins that is formed by applying the NPN insulating structure of the probe shown in FIG. 8 to the probe with a reverse-bend structure shown in FIG. 21.

FIG. 22 shows the double reverse-bend structure probe 2 equipped with electrode fins. The probe is formed by incorporating the NPN insulating structure and the electrode fins of the probe shown in FIG. 8 with the probe main body structure of the probe shown in FIG. 21. The electrode fins PF are used to enable the probe to be actuated by an attractive electrostatic force control exerted between the electrode fins and the memory substrate 7 (see FIG. 4). The probe shown in FIG. 22 is driven by the probe driving circuit shown in FIG. 3B.

In embodiments in which the probe main body has a laminated structure similar to that shown in FIG. 20 or FIG. 21, there may be instances, as described above with reference to FIGS. 2 and 5, in which warping occurs during fabrication. Severe instances of warping render the probe device unfit for practical use. However, the probe main body 21 shown in FIG. 22 has a single-layer structure. As in the case of the probe shown in FIG. 8, the structure shown in FIG. 22 does not suffer from warping that would cause any problems in terms of practical use.

Figure 23A:
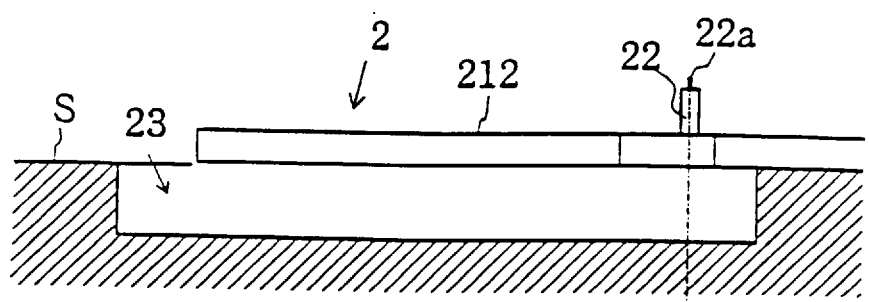
FIGS. 23A and 23B illustrate the actuation of the probes in an embodiment in which probes having the form of a cantilever with a reverse bend are used.
Figure 23B:
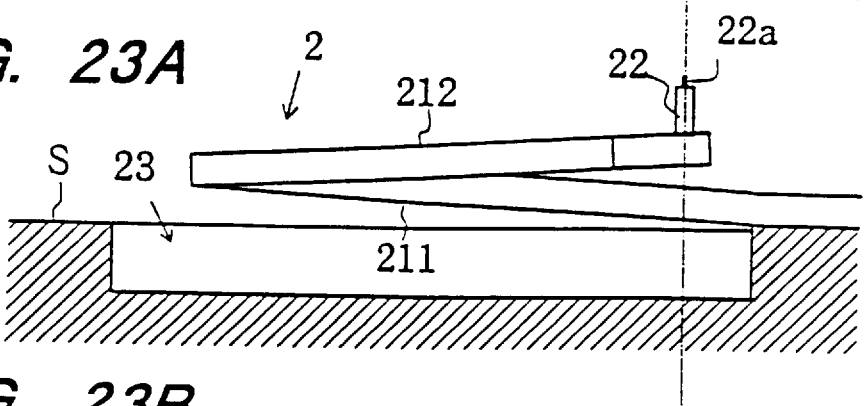

By forming each probe 2 as a cantilever with a reverse bend as shown in FIGS. 19 through 22, it is possible to design the probe so that there is almost no positional shift of the conductive needle tip 22a, regardless of the extent of bending of the probe main body 21 in response to the actuation force. This is shown in FIGS. 23A and 23B. FIG. 23A shows the embodiment of the probe 2 shown in FIG. 19 in its rest position, prior to being actuated. FIG. 23B shows the same probe after it has been driven away from the substrate surface S and towards the memory medium.

The memory substrate 7 may include a substrate having a plane surface on which the memory medium 71 is formed. Alternatively, the substrate may have a two-dimensional array of grooves formed in its plane surface on which the memory medium is formed. Substrates with various constructions may be used.

Figure 24A:
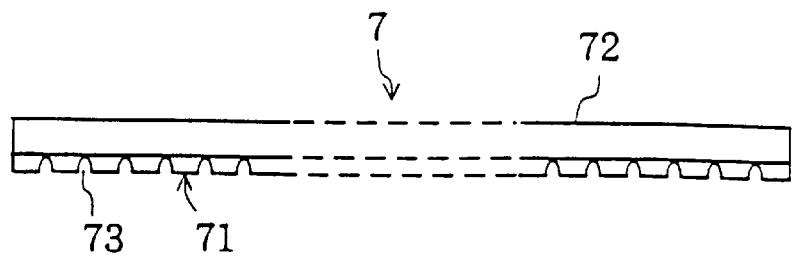
FIGS. 24A and 24B respectively show a sectional view and a plan view of an example of a memory substrate that can be used in the memory device according to the invention. The memory substrate has a two-dimensional array of grooves formed in its surface.
Figure 24B:
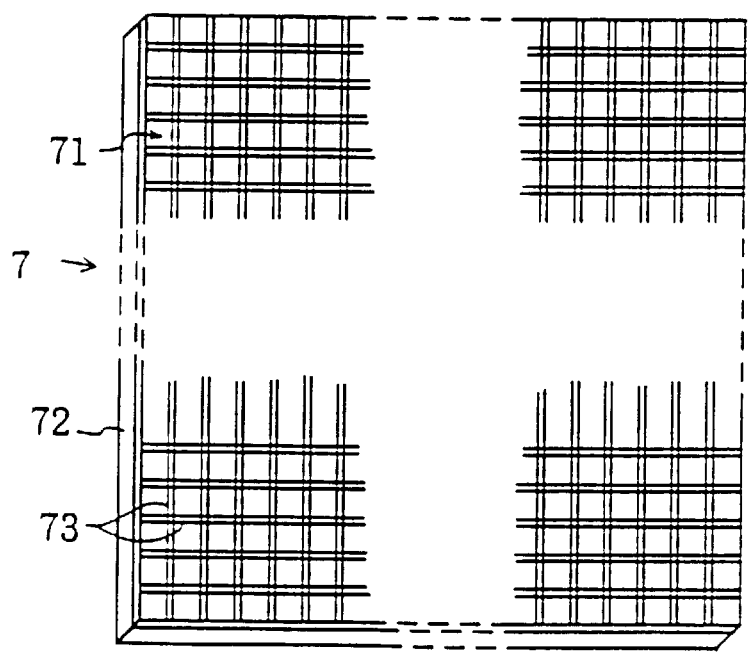

FIGS. 24A and 24B are a cross-sectional view and a plan view that illustrate one example of memory substrate 7 having a two-dimensional array of grooves formed in its plane surface. This memory substrate can be used in the memory device of the invention. The memory substrate 7 is preferably a piece of silicon approximately 1 cm square, with a thickness in the range of approximately 10 to 100 microns. This memory substrate 7 is formed by laminating the substrate 72 and the memory medium 71. A two-dimensional array of grooves 73 is formed over the entire surface of the memory substrate 7.

Generally, warping caused by thermal expansion or thermal contraction tends to occur during fabrication of the substrate if the memory substrate is too thin. However, the grooves 73 formed in the surface of the memory substrate 7 shown in FIGS. 24A and 24B prevent the occurrence of warping that would cause problems in terms of practical use, even if the memory substrate 7 is thin. Accordingly, in embodiments in which the positioning device 91 (see FIG. 4) moves the memory substrate 7, the reduction in weight achieved by using a thin substrate enables the positioning device to move the memory substrate 7 at high speed. The grooves 73 can be formed by such techniques as photolithography or etching.

It is usually desirable to form the grooves 73 so that the grooves are positioned at the boundaries between adjacent recording regions of the memory medium 71. Each recording region is the area of the memory medium accessed by one probe. If the spacing of the separating grooves 73 is too great, warping cannot be reduced to the desired level. Consequently, it is preferable to form each of the grooves 73 at the boundaries of all of the recording regions. If the spacing of the separating grooves 73 is too small, the grooves cannot be positioned at the boundaries of adjacent recording regions. Where warping caused by thermal expansion or thermal contraction during fabrication is a problem, the depth of the separating grooves 73 may be at least half of the thickness of the memory substrate 7.

Although this disclosure describes illustrative embodiments of the invention in detail, it is to be understood that the invention is not limited to the precise embodiments described, and that various modifications may be practiced within the scope of the invention defined by the appended claims.

We claim:

1. A memory device, comprising:

a planar memory medium; and a probe device mounted opposite the planar memory medium, the probe device including a substrate having a substrate surface and probe cells arrayed on the substrate surface, each of the probe cells comprising:

a probe formed in the substrate and including part of the substrate surface, the probe additionally including a conductive needle projecting towards the memory medium, the conductive needle including a needle tip adjacent the memory medium, an auxiliary electrode mounted on the probe, the auxiliary electrode being located between the probe and the memory medium, and being disposed substantially parallel to, and spaced from, the substrate surface; and a probe driving circuit formed in the substrate and projecting from the substrate surface towards the memory medium, the probe driving circuit having outputs electrically connected to the auxiliary electrode and the memory medium.

2. The memory device of claim 1, in which:

the needle tip has a length in a direction perpendicular to the substrate surface; and the needle tip has a constant cross section along its length in a plane parallel to the substrate surface.

3. The memory device of claim 2, in which:

the substrate includes a silicon surface layer, a silicon oxide intermediate layer, and a semiconductor substrate; and the probe is formed in the silicon surface layer.

4. The memory device of claim 1, in which:

the substrate includes a silicon surface layer, a silicon oxide intermediate layer, and a semiconductor substrate; and the probe is formed in the silicon surface layer.

5. The memory device of claim 1, in which:

the needle tip is formed of a material;

plural atoms of the material of the needle tip contact the memory medium when the needle tip contacts the memory medium; and the probe driving circuit is configured to apply a predetermined probe actuation voltage between the auxiliary electrode and the memory medium, the predetermined probe actuation voltage causing the probe to bring the needle tip into contact with the memory medium, and to apply a force to the needle tip that does not exceed an inter-atomic bonding force of the material of the needle tip when divided among the atoms of the material of the needle tip contacting the memory medium.

6. A memory device, comprising:

a planar memory medium;

a probe device mounted opposite the memory medium, the probe device including:
 a substrate having a substrate surface, and
 probes arrayed on the substrate surface, each of the probes including a probe main body and a conductive needle projecting from the probe main body and terminating in a needle tip, the needle tip having a length in a direction perpendicular to the substrate surface, and having a constant cross section along its length in a plane parallel to the substrate surface.

7. The memory device of claim 6, in which:

the substrate includes a silicon surface layer, a silicon oxide intermediate layer, and a semiconductor substrate; and the probes are formed in the silicon surface layer.

8. The memory device of claim 6, in which each of the probes reads or writes information in the memory medium only when the needle tip is in contact with the memory medium.

9. The memory device of claim 8, in which:

the needle tip is formed of a material; and when the needle tip contacts the surface of the memory medium:
 plural atoms of the material of the needle tip contact the surface the memory medium, and
 each of the probes applies a force to the needle tip that does not exceed an inter-atomic bonding force of the material of the needle tip when divided among the plural atoms of the material of the needle tip contacting the memory medium.

10. A memory device, comprising:

a planar memory medium; and a probe device mounted opposite the memory medium, the probe device including:
 a semiconductor surface layer having a surface,
 an insulating layer under the semiconductor surface layer, and probe cells arrayed on the surface, each of the probe cells comprising:
  a cantilever probe defined in the semiconductor surface layer and having a first end attached to the insulating layer, the probe including a conductive needle mounted near a second end, the conductive needle projecting towards the memory medium and terminating in a columnar needle tip adjacent the memory medium; and
  an open-loop probe driving circuit formed near the cantilever probe, the probe driving circuit having an output electrically connected to the probe, and generating a predetermined probe actuating voltage that actuates the probe to bring the needle tip into contact with the memory medium for reading or writing information in the memory medium.

11. The memory device of claim 10, in which the probe device additionally includes a semiconductor substrate under the insulating layer.

12. The memory device of claim 10, in which the probe device additionally includes an auxiliary electrode mounted on the probe, the auxiliary electrode being located between the probe, and being disposed substantially parallel to, and spaced from, the surface.

13. The memory device of claim 12, in which:

the needle tip is formed of a material;

plural atoms of the material of the needle tip contact the memory medium when the needle tip contacts the memory medium; and the predetermined probe actuation voltage causes the probe to bring the needle tip into contact with the memory medium, and to apply a force to the needle tip that does not exceed an inter-atomic bonding force of the material of the needle tip when divided among the plural atoms of the material of the needle tip contacting the memory medium.

14. The memory device of claim 10, in which:

the needle tip is formed of a material;

plural atoms of the material of the needle tip contact the memory medium when the needle tip contacts the memory medium; and the predetermined probe actuation voltage causes the probe to bring the needle tip into contact with the memory medium, and to apply a force to the needle tip that does not exceed an inter-atomic bonding force of the material of the needle tip when divided among the plural atoms of the material of the needle tip contacting the memory medium.

15. The memory device of claim 10, in which the probe driving circuit is configured to generate a quasi-static probe actuation voltage.

16. The memory device of claim 10 in which the probe driving circuit is configured to generate probe actuation voltage that varies dynamically in the course of a read or write cycle.

17. The memory device of claim 10, in which the probe device additionally includes:

a source of the probe actuation voltage;

a bus interconnecting the source to the probe driving circuits of plural ones of the probe cells; and the probe driving circuit includes a switch connected between the bus and the probe.

18. The memory device of claim 10, in which:

the cantilever probe includes two orthogonally-disposed arms, each of the arms having a first end and a second end, the first ends being attached to the insulating layer, the second ends being joined together the conductive needle is mounted on the second arm near the second end thereof.

19. The memory device of claim 18, in which the first arm and the second arm are portions of a single L-shaped piece of the semiconductor surface layer.

20. The memory device of claim 18, in which:

the single piece of the semiconductor surface layer is doped with impurities of a first conductivity type to make it conductive;

part of the single piece of the semiconductor surface layer near the second end of the first arm is doped with impurities of a second conductivity type to electrically insulate the first arm from the second arm;

the first arm is electrically connected to the output of the probe driving circuit; and the second arm provides an electrical connection to the conductive needle.

* * * * *